(12) United States Patent
Ohta et al.

(10) Patent No.: US 8,207,312 B2
(45) Date of Patent: Jun. 26, 2012

(54) METHOD OF PREPARING COMPLEX-AZO PIGMENT AND COMPLEX-AZO PIGMENT THEREOF

(75) Inventors: Masafumi Ohta, Numazu (JP); Hiromi Tada, Numazu (JP); Yoshiki Yanagawa, Susono (JP)

(73) Assignee: Ricoh Company, Ltd., Tokyo (JP)

( * ) Notice: Subject to any disclaimer, the term of this patent is extended or adjusted under 35 U.S.C. 154(b) by 293 days.

(21) Appl. No.: 12/498,492

(22) Filed: Jul. 7, 2009

(65) Prior Publication Data

US 2010/0010204 A1 Jan. 14, 2010

(30) Foreign Application Priority Data

Jul. 9, 2008 (JP) ................ 2008-179262
Jul. 9, 2008 (JP) ................ 2008-179282
Mar. 9, 2009 (JP) ................ 2009-054602

(51) Int. Cl.
C09B 43/00 (2006.01)

(52) U.S. Cl. ...................................... 534/588

(58) Field of Classification Search ................. None
See application file for complete search history.

(56) References Cited

U.S. PATENT DOCUMENTS

| | | | |
|---|---|---|---|
| 4,743,523 A * | 5/1988 | Yamashita et al. | 430/58.4 |
| 4,939,058 A * | 7/1990 | Shibata et al. | 430/72 |
| 5,312,707 A | 5/1994 | Ota et al. | |
| 5,489,495 A | 2/1996 | Anzai et al. | |
| 5,492,784 A | 2/1996 | Yoshikawa et al. | |
| 5,631,404 A | 5/1997 | Anzai et al. | |
| 5,672,756 A | 9/1997 | Shimada et al. | |
| 5,747,204 A | 5/1998 | Anzai et al. | |
| 5,830,980 A | 11/1998 | Anzai et al. | |
| 6,027,846 A | 2/2000 | Shimada et al. | |
| 6,274,728 B1 | 8/2001 | Hall-Goulle et al. | |
| 6,316,577 B1 | 11/2001 | Shimada et al. | |
| 7,390,600 B2 | 6/2008 | Toda et al. | |
| 7,416,823 B2 | 8/2008 | Yanagawa et al. | |
| 7,473,504 B2 | 1/2009 | Yanagawa et al. | |
| 2005/0221210 A1 | 10/2005 | Suzuki et al. | |
| 2005/0266328 A1 | 12/2005 | Yanagawa et al. | |
| 2005/0282075 A1 | 12/2005 | Ikuno et al. | |
| 2005/0287452 A1 | 12/2005 | Tamura et al. | |
| 2007/0009818 A1 | 1/2007 | Yanagawa et al. | |
| 2007/0059619 A1 | 3/2007 | Shimoyama et al. | |
| 2007/0212627 A1 | 9/2007 | Yanagawa et al. | |
| 2007/0269729 A1 | 11/2007 | Ikuno et al. | |
| 2007/0297836 A1 | 12/2007 | Kawasaki et al. | |
| 2008/0038649 A1 | 2/2008 | Hirose et al. | |
| 2008/0063962 A1 | 3/2008 | Toshine et al. | |
| 2008/0102391 A1 | 5/2008 | Yanagawa et al. | |
| 2008/0227007 A1 | 9/2008 | Tamoto et al. | |
| 2008/0292981 A1 | 11/2008 | Toda et al. | |
| 2009/0005546 A1 * | 1/2009 | Ohta | 534/658 |
| 2009/0035017 A1 | 2/2009 | Tada et al. | |
| 2009/0068577 A1 | 3/2009 | Ohta et al. | |

FOREIGN PATENT DOCUMENTS

| | | |
|---|---|---|
| JP | 03-009962 | 1/1991 |
| JP | 07-128890 | 5/1995 |
| JP | 09-127711 | 5/1997 |
| JP | 2001-290296 | 10/2001 |
| JP | 2002-023399 | 1/2002 |
| JP | 2007-334099 | 12/2007 |
| JP | 2009-007523 | 1/2009 |
| JP | 2009-67850 | 4/2009 |

* cited by examiner

*Primary Examiner* — Kamal Saeed

(74) *Attorney, Agent, or Firm* — Oblon, Spivak, McClelland, Maier & Neustadt, L.L.P.

(57) ABSTRACT

A method of preparing a complex-azo pigment having plural pigment components including at least an azo pigment represented by the following formula (a)

$$A(H)_n \qquad (a)$$

Pigments, both limited and unlimited by the process of making.

10 Claims, No Drawings

METHOD OF PREPARING COMPLEX-AZO PIGMENT AND COMPLEX-AZO PIGMENT THEREOF

BACKGROUND OF THE INVENTION

1. Field of the Invention

The present invention relates to a method of preparing complex-azo pigments and to complex-azo pigments both limited by (i.e., made by) the described process and not so limited (i.e., not so made) by the described process.

2. Discussion of the Background

Conventionally, azo pigments are available as organic electrophotographic photoreceptors, particularly useful as a charge generating material. Multilayer electrophotographic photoreceptor is one example of photoconductors includes an electroconductive support, a charge generating layer includes a charge generating material that generates a charge by means of light, and a charge transporting layer includes a charge transporting material that transports a charge injected from the charge generating layer.

A variety of azo compounds for use in the photoconductor are conventionally proposed, for example, benzidine bisazo compounds in unexamined published Japanese patent application No. (hereinafter referred to as JOP) 47-37543 and JOP 52-55643, stilbene bisazo compounds in JOP 52-8832, diphenyl hexatriene bisazo compounds in JOP 58-222152, and diphenyl butadiene bisazo compounds in JOP 58-222153. When only single azo pigment is used as a charge generating material in a photoreceptor has a sensitivity to narrow wavelength range and electrophotograph properties are changeable depending on environment. Therefore, a photoreceptor having single azo pigment doesn't have a demanded high-resolution property, and also it doesn't have sufficient properties for a high-speed copying machine or laser beam printer.

For solving these problems, a technology of mixing at least two pigments and using as generating materials is produced. For example, a method of mixing and having a phthalocyanine and a fluorenone azo pigment in Japanese patent No. 3326706 and JOP 2001-290296, a method of mixing and having a phthalocyanine and an azo pigment in JOP 9-127711, a method of mixing and having a metallophthalocyanine and a perylene pigment in JOP 2002-23399, a method of mixing and having a quinacridone pigment and a titanylphthalocyanine pigment in JOP 2007-334099, a method of mixing and having a titanylphthalocyanine pigment and other phthalocyanine pigment in JOP 3-9962. Even though pigments were developed as mentioned above, pigments for a photoconductor suitable for a high-speed copying machine having good quality of image forming have not been provided.

Pigments disclosed in documents mentioned above usually have poor solubility to organic solvents, so a method for purification of pigment is limited to a washing method using organic solvents. By the washing process, impurities in pigment can be remained after purification. As a method of mixing pigments, mechanical mixing, for example milling is used. In such a manner, mixing and making complex of pigments is difficult, so enough function as an organic photoconductor can't be provided. The method using acid pasting is disclosed, but for the method, it's necessary to use concentrated sulfuric acid, so an application of the method to producing pigments is limited because of problem in productivity.

From such situation, complex-azo pigments as a charge generating material that overcome conventional weak points are expected. A soluble precursor for pigments are disclosed in PCT patent application publications No. 2001-513119 (WO98/32802), but developing functions by making a pigment as a complex is not known.

Because of these reasons, a need exists for a charge generating material photoconductor suitable for a high-speed copying machine.

SUMMARY OF THE INVENTION

Accordingly, an object of the present invention is to provide a complex-azo pigment and a method of producing as charge generating material photoconductor suitable for a high-speed copying machine or laser beam printer having a good quality of image forming.

Briefly this object and other objects of the present invention as hereinafter described will become more readily apparent and can be attained, either individually or in combination thereof, by a method of preparing a complex-azo pigment having plural pigment components including at least an azo pigment represented by the following formula (a) comprising, converting an azo compound having a carboester group represented by the following formula (I) into an azo compound represented by the following formula (a) by chemically, thermally or photolytically decarboesterifying.

$$A(E)n \quad\quad (I)$$

wherein A represents a residue of an azo compound, bonded with n pieces of E group through one or more heteroatoms being N or O and forming a part of the residue A, the number of heteroatoms not being limited but preferably 1 to 9, and E group independently represents a hydrogen atom or a carboester group represented by the following formula (b),

$$—C(=O)—O—R1 \quad\quad (b)$$

wherein R1 represents a substituted or unsubstituted alkyl group having 3 to 15 carbon atoms, a substituted or unsubstituted alkenyl group having 3 to 15 carbon atoms, a substituted or unsubstituted alkynyl group having 3 to 15 carbon atoms, a substituted or unsubstituted cycloalkyl group having 3 to 15 carbon atoms, a substituted or unsubstituted cycloalkenyl group having 3 to 15 carbon atoms, a substituted or unsubstituted aralkyl group having 3 to 15 carbon atoms, all E groups are not hydrogen atoms on the same time, and n represents an integer of from 1 to 9. Where multiple E groups are present they may be the same or different. A complex-azo pigment having plural pigment components including at least an azo pigment represented by the following formula (a) also makes up a part of the invention.

$$A(H)n \quad\quad (a)$$

wherein A is same as the above-mentioned, H represents a hydrogen atom. n represents an integer of from 1 to 9.

It is preferred that, in the method of preparing a complex-azo pigment mentioned above, converting an azo compound having a carboester group represented by the following formula (I) into an azo compound represented by the following formula (a) by chemically, thermally or photolytically decarboesterifying.

$$A(E)n \quad\quad (I)$$

wherein A represents a residue of an azo compound, bonded with n pieces of E group through one or more heteroatom being N or O and forming a part of the residue A, and E group independently represents a hydrogen atom or a carboester group represented by the following formula (b),

$$—C(=O)—O—R1 \quad\quad (b)$$

wherein R1 represents a substituted or unsubstituted alkyl group having 4 to 10 carbon atoms, a substituted or unsubstituted alkenyl group having 4 to 10 carbon atoms, a substituted or unsubstituted alkynyl group having 4 to 10 carbon atoms, a substituted or unsubstituted cycloalkyl group having 4 to 10 carbon atoms, a substituted or unsubstituted cycloalkenyl group having 4 to 10 carbon atoms, a substituted or unsubstituted aralkyl group having 4 to 10 carbon atoms, all E groups are not hydrogen atoms on the same time, and n represents an integer of from 1 to 9. Where multiple E groups are present they may be the same or different in every aspect of the present invention.

$$A(H)n \qquad (a)$$

wherein A is same as the above-mentioned, H represents a hydrogen atom, and n represents an integer of from 1 to 9.

It is preferred that, in the method of preparing a complex-azo pigment mentioned above, converting the azo compound having a carboester group represented by the formula (I) into an azo compound represented by the formula (a) under coexistence with other pigment.

It is preferred that, in the method of preparing a complex-azo pigment mentioned above, and in the complex-azo pigments of the invention, said other pigment includes at least one of phthalocyanine pigments, azo pigments, condensed polycyclic pigments, fullerene, carbon nanotube or inorganic nanopigments.

It is preferred that, in the method of preparing a complex-azo pigment mentioned above, converting at least two azo compounds having a carboester group represented by the formula (I) into an azo compound represented by the formula (a) on the same time or step by step by chemically, thermally or photolytically decarboesterifying.

It is preferred that, in the method of preparing a complex-azo pigment mentioned above, the azo compound having a carboester group represented by the formula (I) is dissolved in an organic solvent to provide a solution (i) and then adsorption treatment is applied to the solution (i) using silicagel, alumina, florisil, activated carbon, activated soil, diatomaceous earth or perlite to provide a solution (ii), converting the compound represented by the formula (I) included in the solution (ii) into a compound represented by the formula (a) by decarboesterifying the azo compound having a carboester group represented by the formula (I) by chemically means, thermally means or photolytically means.

It is preferred that, in the method of preparing a complex-azo pigment mentioned above, the chemically means is using an acidic catalyst.

It is preferred that, in the method of preparing a complex-azo pigment mentioned above, decarboesterifying the azo compound by chemically means and thermally means.

It is preferred that, in the method of preparing a complex-azo pigment mentioned above, in the formula (I) and the formula (a), A represents a residue of an azo compound represented by the following formula (II), $$B-(N=N-Cp)_m \qquad (II)$$

wherein B represents a main skeleton of azo compound, Cp represents a coupler component residue, and m represents an integer of 2 or 3.

In the method of preparing a complex-azo pigment mentioned above, it is preferred that Cp in the formula (II) is at least any one of compounds having the following formulae (1) to (9),

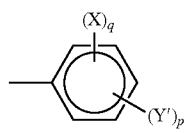

(1)

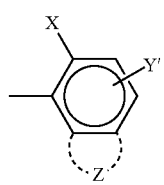

(2)

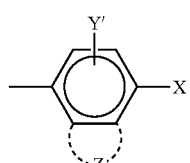

(3)

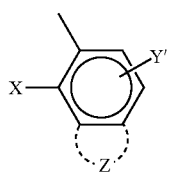

(4)

wherein X in the formulae from (1) to (4) represents —OH, —N(R1)(R2) or —NHSO$_2$—R3, R1 and R2 represent a hydrogen atom or a substituted or unsubstituted alkyl group, R3 represents a substituted or unsubstituted alkyl group or a substituted or unsubstituted aryl group, Y1 in the formulae from (1) to (4) represents a hydrogen atom, a halogen atom, a substituted or unsubstituted alkyl group, a substituted or unsubstituted alkoxy group, a carboxy group, sulfone group, a substituted or unsubstituted sulfamoyl group or —CON (R4)(Y2), R4 represents a hydrogen atom, a substituted or unsubstituted alkyl group, a substituted or unsubstituted phenyl group, Y2 represents a substituted or unsubstituted cycloalkyl group, substituted or unsubstituted heterocycloalkyl group or —N=C(R5)(R6), R5 represents a substituted or unsubstituted cycloalkyl group, substituted or unsubstituted heterocycloalkyl group or substituted or unsubstituted styryl group, R6 represents a hydrogen atom, a substituted or unsubstituted alkyl group or a substituted or unsubstituted phenyl group, and alternatively R5 and R6 optionally form a ring with carbon atoms bonded therewith, Z represents a substituted or unsubstituted cycloalkyl group or a substituted or unsubstituted heterocycloalkyl group, p represents an integer of 1 or 2, q represents an integer of 1 or 2.

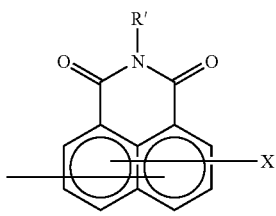

(5)

wherein R7 in the formula (5) represents a substituted or unsubstituted hydrocarbon group and X is same as the above-mentioned.

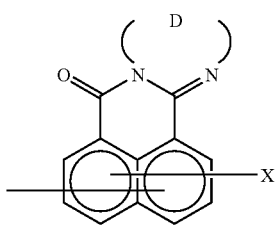

(6)

wherein D in the formula (6) represents a substituted or unsubstituted divalent radical of an aromatic hydrocarbon for forming a heterocycle having N atoms including the two N atoms indicated in the formula (6), or represents a substituted or unsubstituted divalent radical including at least one more heteroatom except the two N atoms indicated in the formula (6) for forming a ring including N atom, and X is same as the above-mentioned.

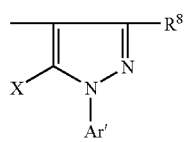

(7)

wherein R8 in the formula (7) represents a substituted or unsubstituted alkyl group, carbamoyl group, carboxy group or its ester, Ar1 represents a substituted or unsubstituted cycloalkyl group, and X is same as the above-mentioned.

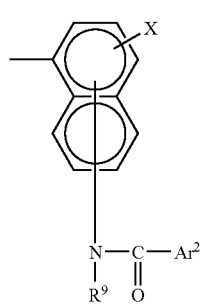

(8)

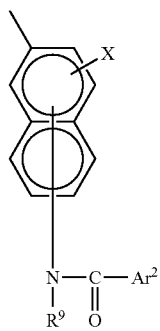

(9)

wherein R9 in the formula (8) and formula (9) represents a hydrogen atom, a substituted or unsubstituted hydrocarbon group, Ar2 represents a substituted or unsubstituted cycloalkyl group, but R9 can't be a hydrogen atom and Ar2 can't be a cycloalkyl group nor cycloalkenyl group on the same time.

It is preferred that, in the method of preparing a complex-azo pigment mentioned above, B in the formula (II) represents the formula (III),

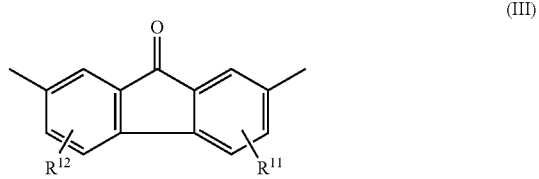

(III)

wherein R11 and R12 in the formula (III) independently represents a hydrogen atom, a halogen atom, a substituted or unsubstituted alkyl group, a substituted or unsubstituted alkoxy group, a carboxyl group or its ester group.

It is preferred that, in the method of preparing a complex-azo pigment mentioned above, B in the formula (II) represents the formula (IV),

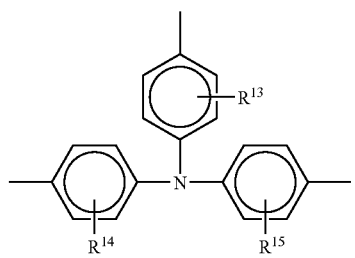

(IV)

wherein R13, R14 and R15 in the formula (IV) independently represents a hydrogen atom, a halogen atom, a substituted or unsubstituted alkyl group, a substituted or unsubstituted alkoxy group, a carboxyl group or its ester group.

It is preferred that, in the method of preparing a complex-azo pigment mentioned above,
B in the formula (II) represents the formula (V),

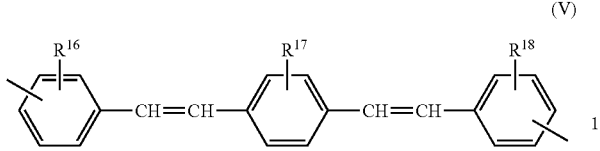

(V)

wherein R16, R17 and R18 in the formula (V) independently represents a hydrogen atom, a halogen atom, a substituted or unsubstituted alkyl group, a substituted or unsubstituted alkoxy group, a carboxyl group or its ester group.

It is preferred that, in the method of preparing a complex-azo pigment mentioned above,
B in the formula (II) represents the formula (VI),

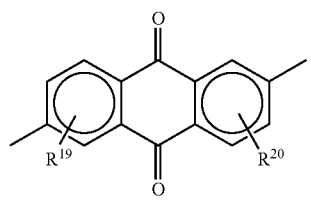

(VI)

wherein R19 and R20 in the formula (VI) independently represents a hydrogen atom, a halogen atom, a substituted or unsubstituted alkyl group, a substituted or unsubstituted alkoxy group, a carboxyl group or its ester group.

It is preferred that, in the method of preparing a complex-azo pigment mentioned above,
B in the formula (II) represents the formula (VII),

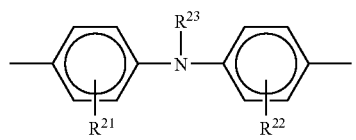

(VII)

wherein R21, R22 and R23 in the formula (VII) independently represents a hydrogen atom, a halogen atom, a substituted or unsubstituted alkyl group, a substituted or unsubstituted alkoxy group, a carboxyl group or its ester group.

It is preferred that, in the method of preparing a complex-azo pigment mentioned above,
B in the formula (II) represents the formula (VIII),

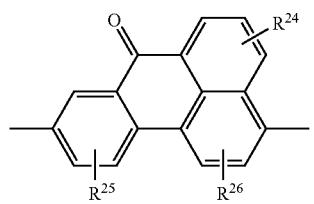

(VIII)

wherein R24, R25 and R26 in the formula (VIII) independently represents a hydrogen atom, a halogen atom, a substituted or unsubstituted alkyl group, a substituted or unsubstituted alkoxy group, a carboxyl group or its ester group.

It is preferred that, in the method of preparing a complex-azo pigment mentioned above,
B in the formula (II) represents the formula (IX),

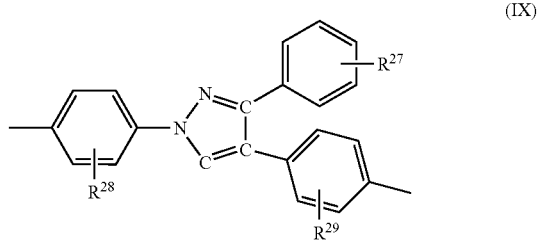

(IX)

wherein R27, R28 and R29 in the formula (IX) independently represents a hydrogen atom, a halogen atom, a substituted or unsubstituted alkyl group, a substituted or unsubstituted alkoxy group, a carboxyl group or its ester group.

It is preferred that, in the method of preparing a complex-azo pigment mentioned above,
B in the formula (II) represents the formula (X),

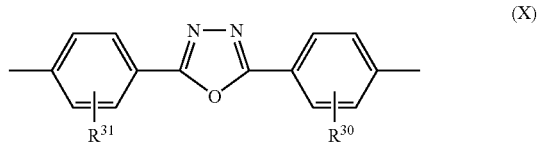

(X)

wherein R30 and R31 in the formula (X) independently represents a hydrogen atom, a halogen atom, a substituted or unsubstituted alkyl group, a substituted or unsubstituted alkoxy group, a carboxyl group or its ester group.

It is preferred that, in the method of preparing a complex-azo pigment mentioned above, wherein in formula (II), Cp is of formula (6) and has the structure,

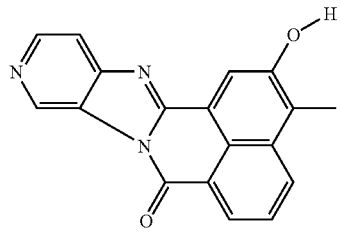

Another illustrative embodiment provides a complex-azo pigment comprising,
an azo compound represented by the formula (a) prepared by decarboesterifying an azo compound having a carboester group represented by the following formula (I) by chemically means, thermally means or photolytically means.

$$A(E)n \quad \quad (I)$$

wherein A represents a residue of an azo compound, bonded with n pieces of E group through one or more heteroatom being N or O and forming a part of the residue A, and E group independently represents a hydrogen atom or a carboester group represented by the following formula (b),

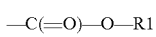 (b)

wherein R1 represents a substituted or unsubstituted alkyl group, a substituted or unsubstituted alkenyl group, a substituted or unsubstituted alkynyl group, a substituted or unsubstituted cycloalkyl group, a substituted or unsubstituted cycloalkenyl group, a substituted or unsubstituted aralkyl group, all E groups are not hydrogen atoms on the same time. n represents an integer of from 1 to 9,

wherein A is same as the above-mentioned, H represents a hydrogen atom. n represents an integer of from 1 to 9.

DETAILED DESCRIPTION OF THE INVENTION

The present invention will be described below in detail with reference to several embodiments.

In the present invention, a complex-azo pigment includes plural pigment components manufactured by decarboesterifying an azo compound having a carboester group represented by the formula (I) by chemically means, thermally means or photolytically means, converting the compound represented by the formula (I) into a compound represented by the formula (a). Azo pigment in a complex-azo pigment can contact and mix with other pigments on the molecule level, these pigments can be uniform and finely dispersed complex construction. Furthermore, impurities can be removed from the pigments, so sufficient functions as an organic photoconductor can be provided.

A complex-azo pigment manufactured by decarboesterifying of an azo compound having a carboester group represented by the formula (I) with other pigment by chemically means, thermally means or photolytically means, or a complex-azo pigment manufactured by decarboesterifying of at least 2, preferably 2 to 5 and also preferably 2 to 3 azo compounds having a carboester group represented by the formula (I) on the same time or step by step, by chemically means, thermally means or photolytically means are preferably used as a organic photoconductor. A photoreceptor having an complex-azo pigment as an organic photoconductor has sufficient sensitivity and stable electrostatic properties.

A complex-azo pigment manufactured by the present invention can be used as a photoconductor suitable for a high-speed copying machine or laser beam.

According to the present invention, a method of preparing a complex-azo pigment includes plural pigment components comprising, converting the compound represented by the formula (I) into a compound represented by the formula (a) by decarboesterifying an azo compound having a carboester group represented by the formula (I) by chemically means, thermally means or photolytically means is provided.

A complex-azo pigment includes plural pigment components in the present invention is manufactured as follows. Converting at least one azo compound having a carboester group represented by the formula (I), another azo compound having a carboester group represented by the formula (I) and/or coexistence of another pigment into an azo compound represented by the formula (a) by decarboesterifying by chemically means, thermally means or photolytically means. Decarboesterifying can be done in the presence of solvent or no solvent.

It is preferable to coexist another pigment during the process of converting into an azo compound represented by the formula (a) by decarboesterifying at least one azo compound having a carboester group represented by the formula (I) in the present invention.

As another pigments preferably for use in the present invention, for example phthalocyanine pigments, azo pigments, condensed polycyclic pigments, fullerene, carbon nanotube or inorganic nanopigments may be used.

As another preferable method of preparing a complex-azo pigment according to the present invention, converting at least 2, preferably 2 to 5 and also preferably 2 to 3 azo compounds having a carboester group represented by the formula (I) to a compound represented by the formula (a) by decarboesterifying on the same time or step by step by chemically means, thermally means or photolytically means can be used.

In the formula (I) and the formula (a), it is preferable that A is a residue of an azo represented by the formula (II). B in the formula (II) represents a main skeleton of azo compound, Cp represents a coupler component residue.

Specific examples of the azo compounds having a carboester group represented by the formula (I) for use in the present invention include compounds having the formula (II), and in the formula (II), B is preferably represented by the formulae (III) to (X), Cp is preferably represented by the formulae (1) to (9).

In the formula (I), E group independently represents a hydrogen atom or a carboester group represented by the following formula (b),

wherein R1 is same as the above-mentioned, all E groups are not hydrogen atoms on the same time. An azo compound (azo pigment) represented by the formula (a) can be obtained by decarboesterifying the carboester group with chemically means, thermally means or photolytically means and replacing to hydrogen atom.

Preferable examples of azo compound having a carboester group represented by the formula (I) for use in the present invention are as follows. Azo compounds having a main skeleton represented by the formula (III), for example, compounds represented by the formulae (III-1) to (III-14). Azo compounds having a main skeleton represented by the formula (IV), for example, compounds represented by the formulae (IV-1) to (IV-5). Azo compounds having a main skeleton represented by the formula (V), for example, compounds represented by the formulae (V-1) to (V-8). Azo compounds having a main skeleton represented by the formula (VI), for example, compounds represented by the formulae (VI-1) to (VI-5). Azo compounds having a main skeleton represented by the formula (VII), for example, compounds represented by the formulae (VII-1) to (VII-7). Azo compounds having a main skeleton represented by the formula (VIII), for example, compounds represented by the formulae (VIII-1) to (VIII-5). Azo compounds having a main skeleton represented by the formula (IX), for example, compounds represented by the formulae (IX-1) to (IX-4). Azo compounds having a main skeleton represented by the formula (X), for example, compounds represented by the formulae (X-1) to (X-6).

In the formulae (III-1) to (III-14), (IV-1) to (IV-5), (V-1) to (V-8), (VI-1) to (VI-5), (VII-1) to (VII-7), (VII-1) to (VIII-5), (IX-1) to (IX-4) and (X-1) to (X-6), E group independently represents a hydrogen atom or a carboester group represented by the following formula (b),

wherein R1 represents a substituted or unsubstituted alkyl group preferably having 3 to 15 carbon atoms and also preferably having 4 to 10 carbon atoms, a substituted or unsubstituted alkenyl group preferably having 3 to 15 carbon atoms and also preferably having 4 to 10 carbon atoms, a substituted or unsubstituted alkynyl group preferably having 3 to 15 carbon atoms and also preferably having 4 to 10 carbon atoms, a substituted or unsubstituted cycloalkyl group preferably having 3 to 15 carbon atoms and also preferably having 4 to 10 carbon atoms, a substituted or unsubstituted cycloalkenyl group preferably having 3 to 15 carbon atoms and also preferably having 4 to 10 carbon atoms, a substituted or unsubstituted aralkyl group preferably having 3 to 15 carbon atoms and also preferably having 4 to 10 carbon atoms, all E groups are not hydrogen atoms on the same time.

Displacing the carboester group to hydrogen atom by decarboesterifying, and then an azo compound (azo pigment) represented by the formula (a) is provided.

Specific examples of the azo compounds having the formula (III) include compounds having the following formulae (III)-1 to (III)-14.

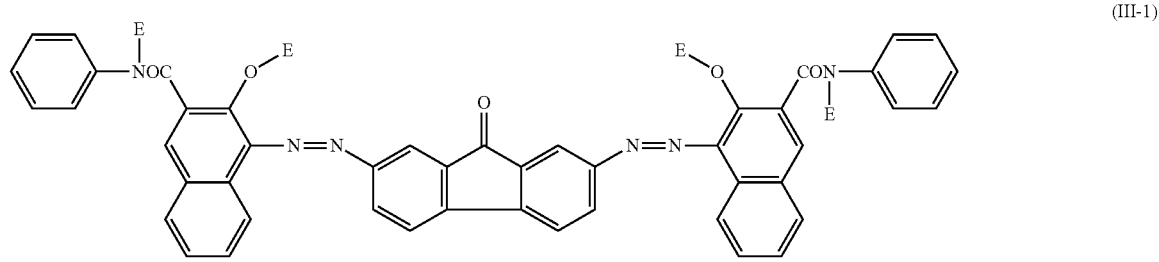

(III-1)

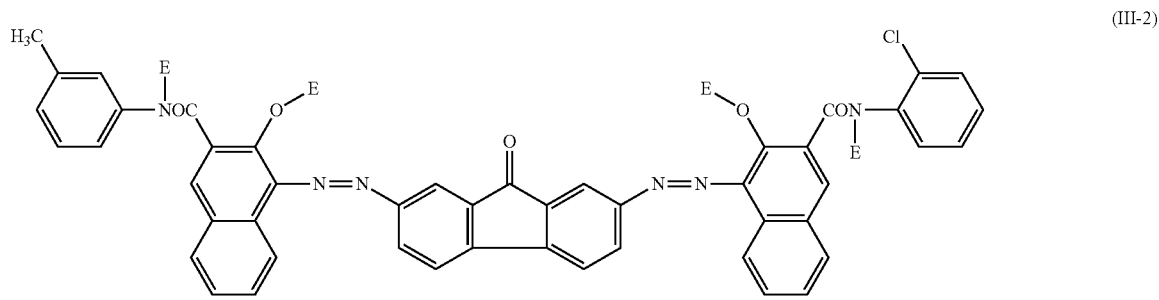

(III-2)

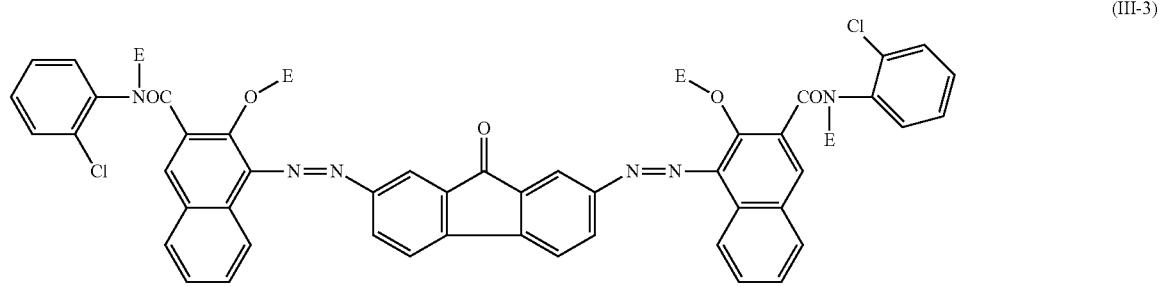

(III-3)

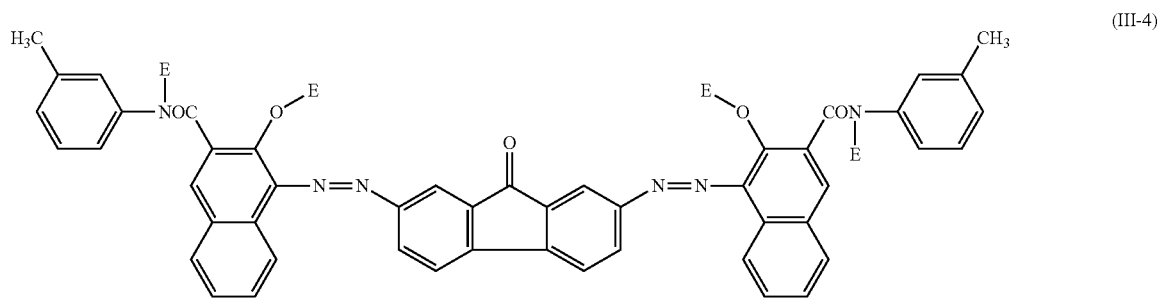

(III-4)

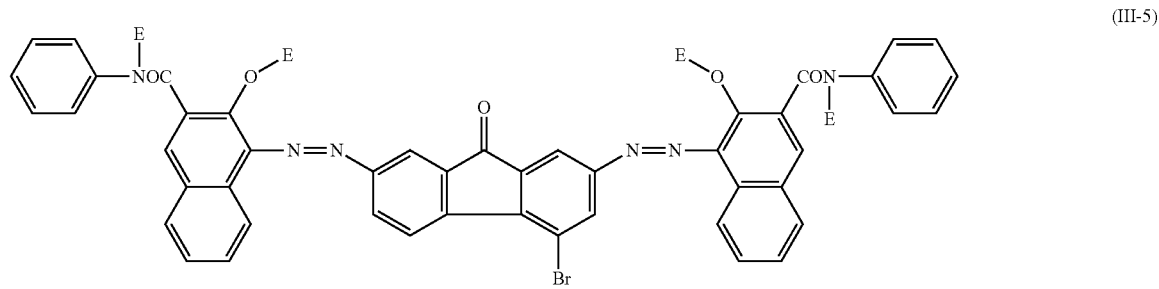

(III-5)

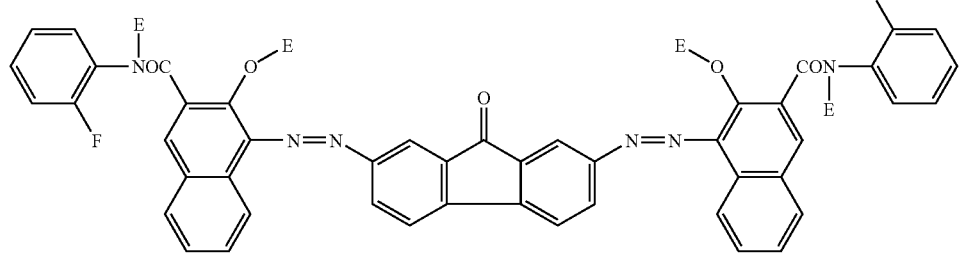
(III-6)
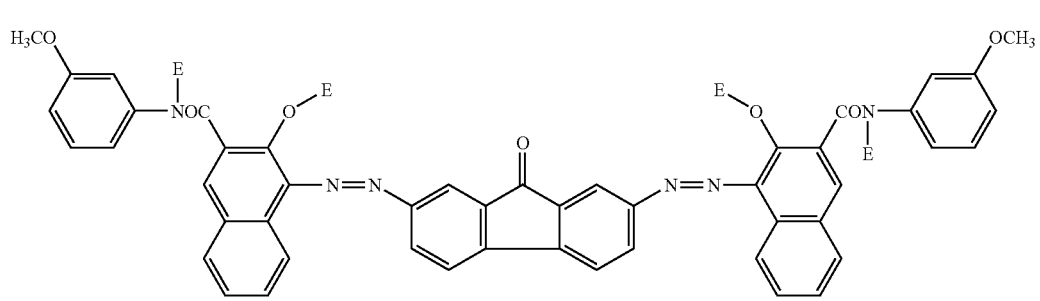
(III-7)
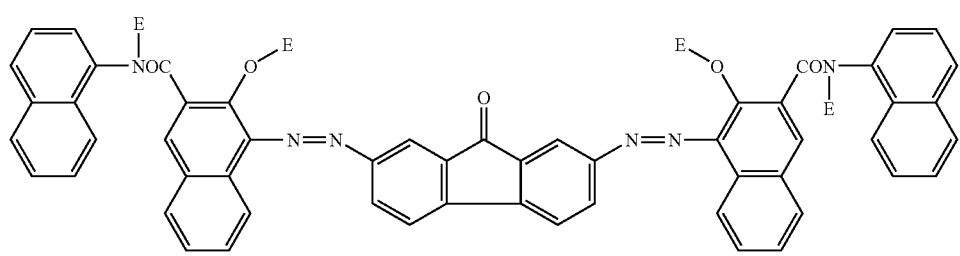
(III-8)
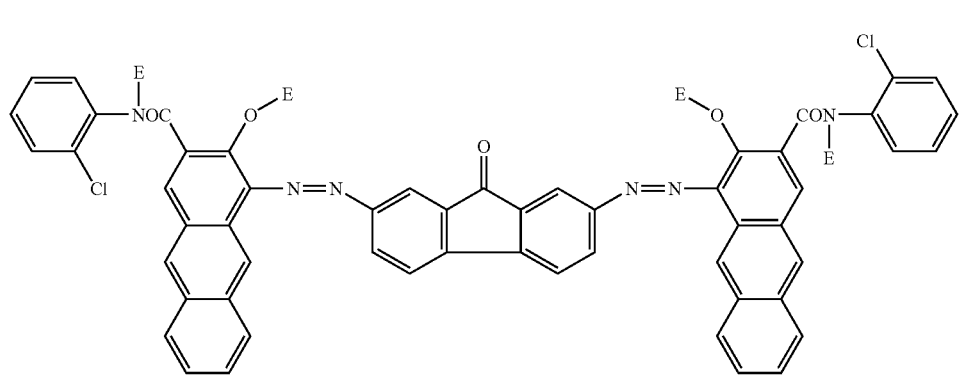
(III-9)
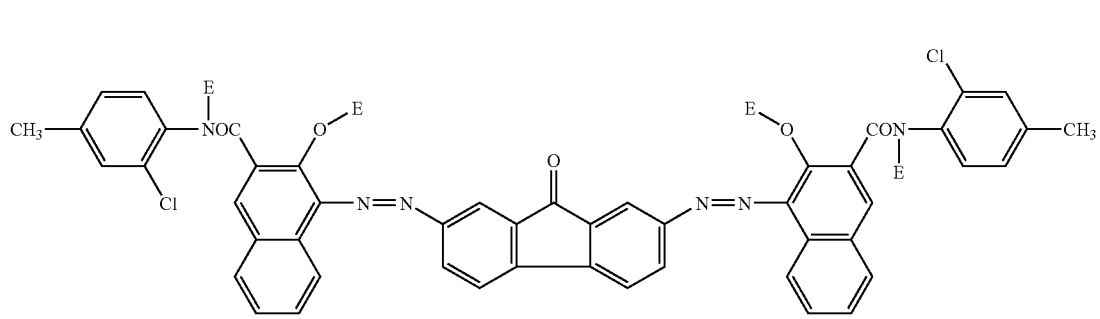
(III-10)

-continued
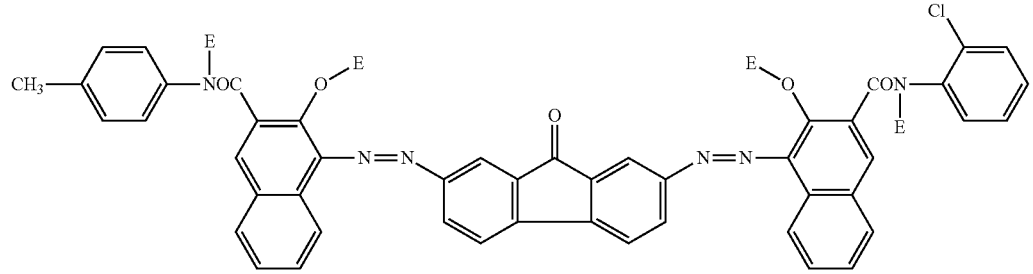
(III-11)
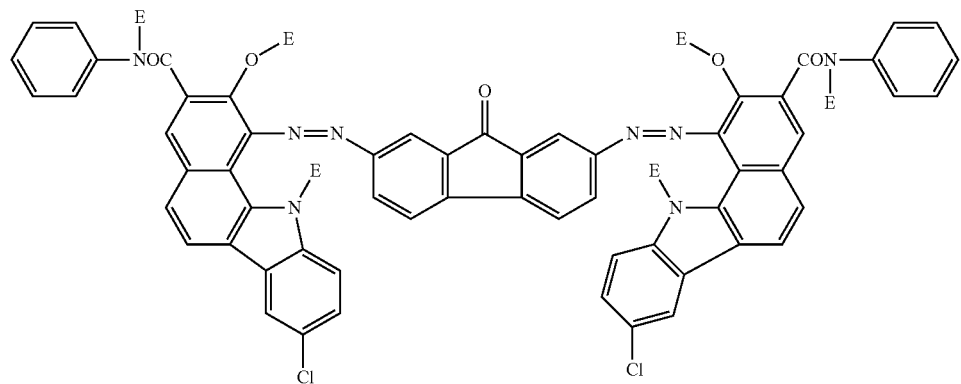
(III-12)
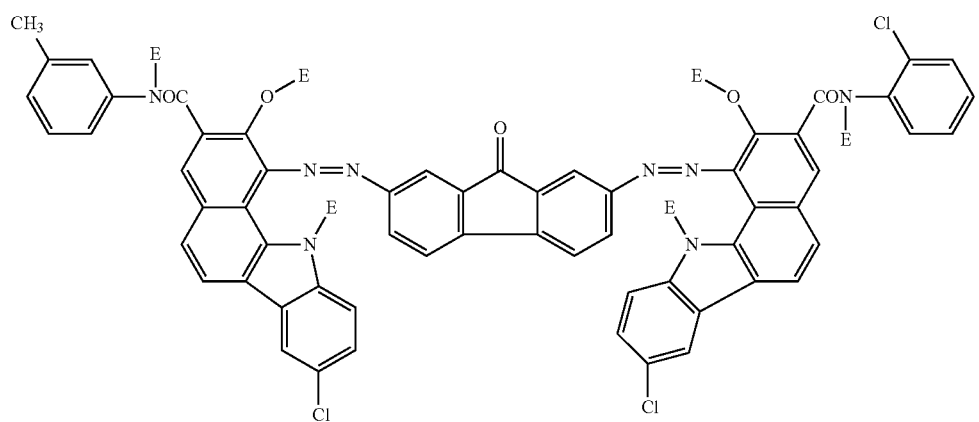
(III-13)
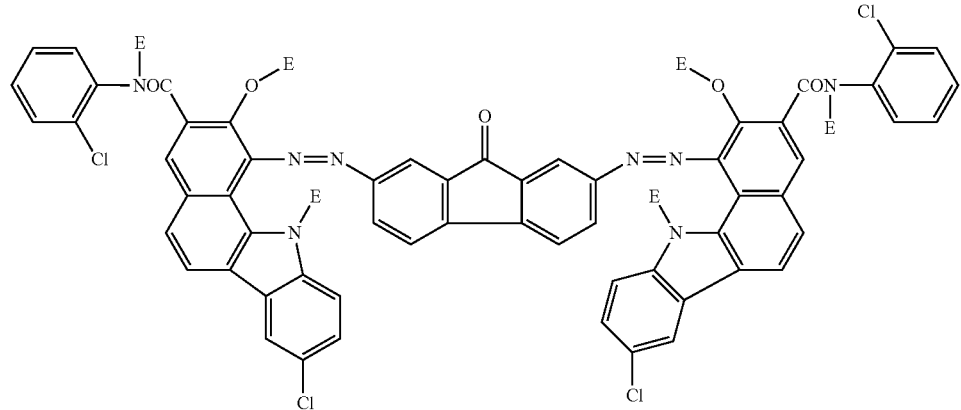
(III-14)

Specific examples of the azo compounds having the formula (IV) include compounds having the following formulae (IV)-1 to (IV)-5.
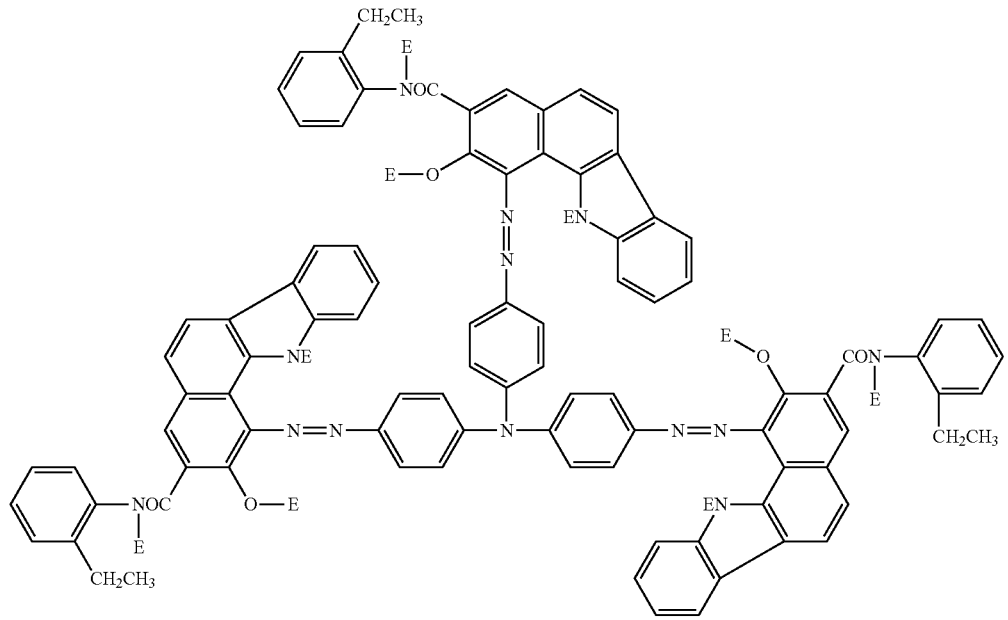
(IV-1)
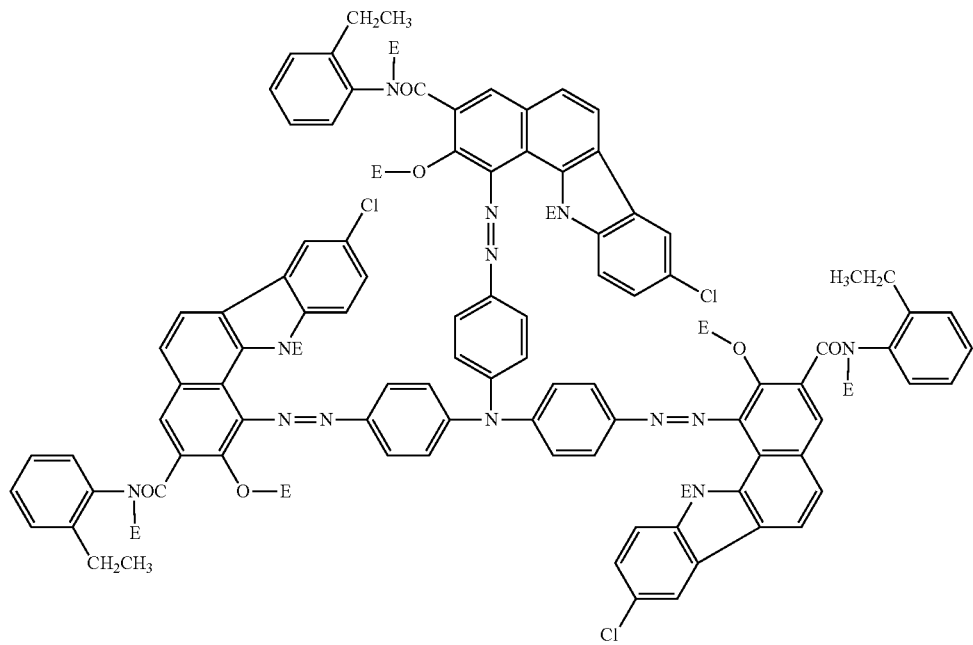
(IV-2)

(IV-3)
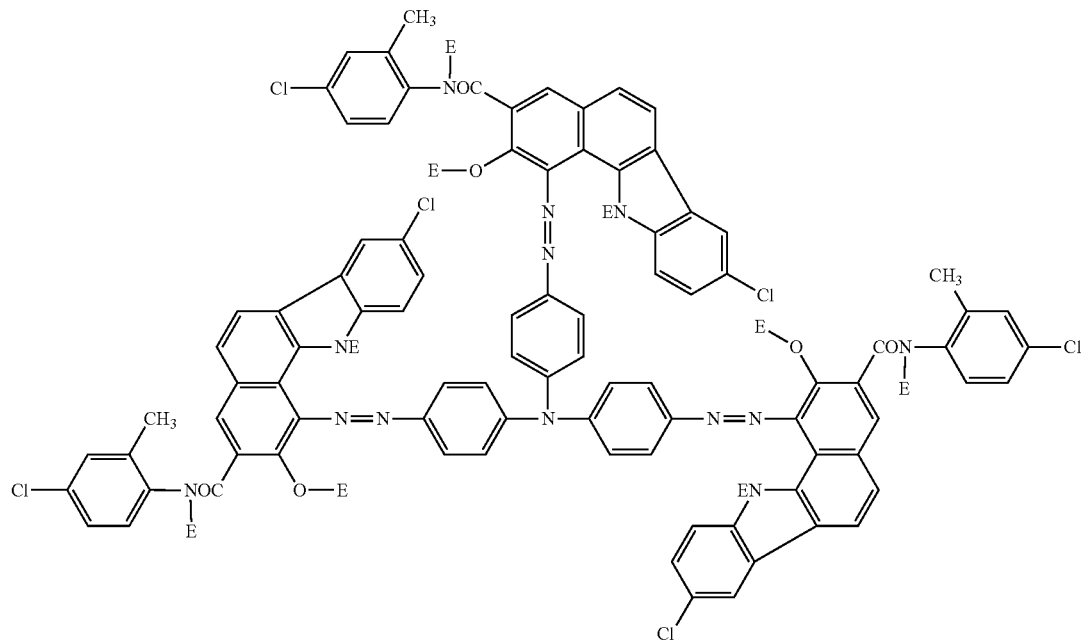
(IV-4)
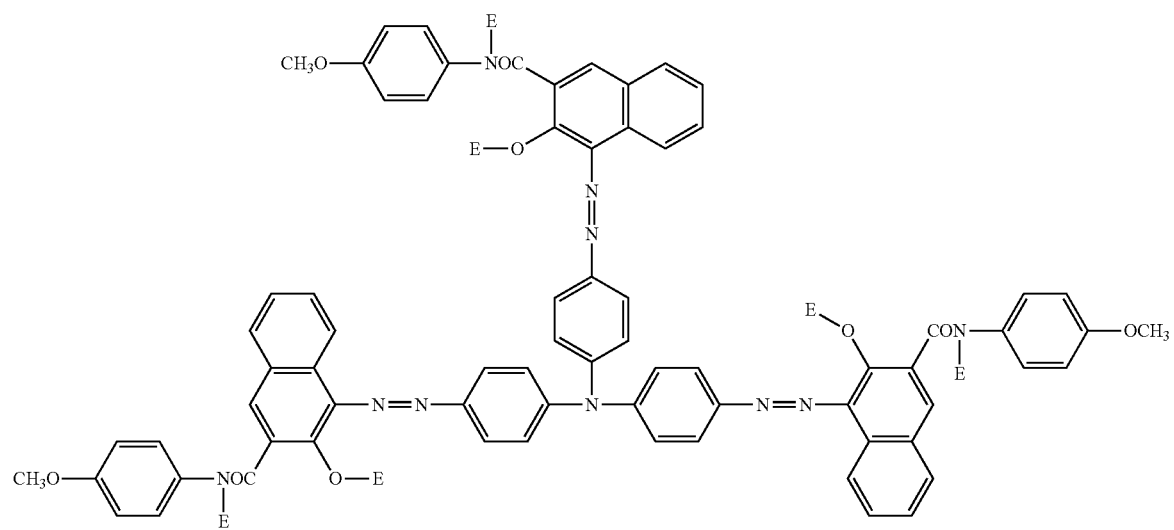

(IV-5)
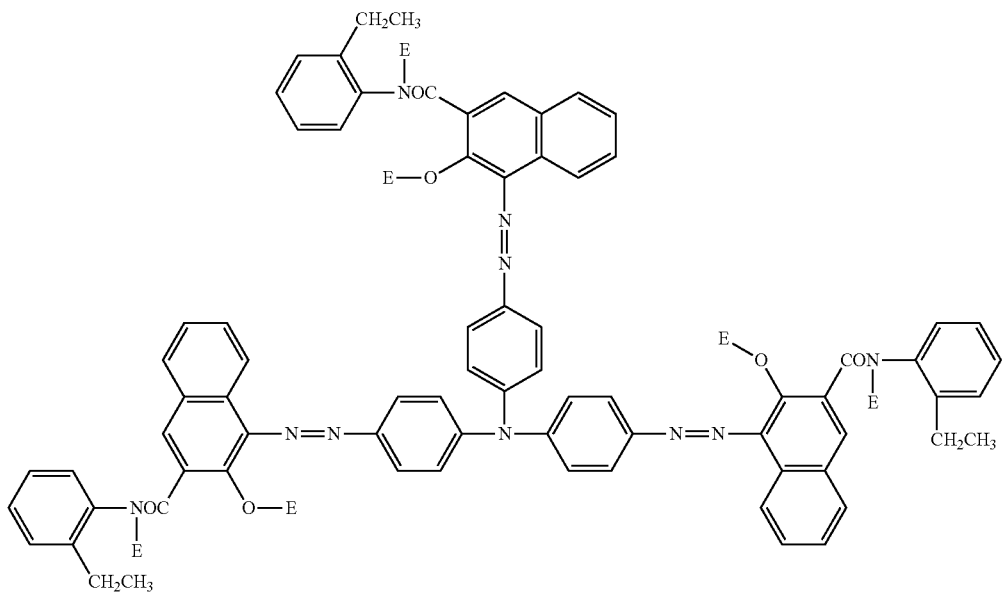
Specific examples of the azo compounds having the formula (V) include compounds having the following formulae (V)-1 to (V)-8.
(V-1)
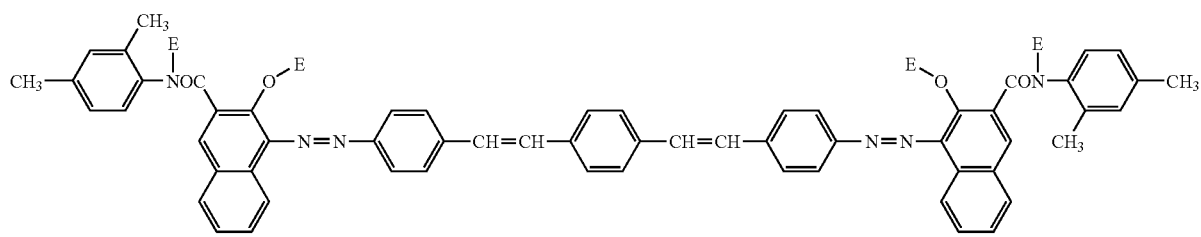
(V-2)
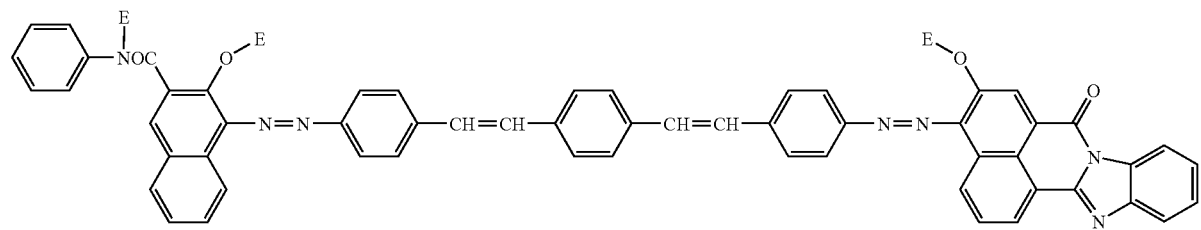

-continued
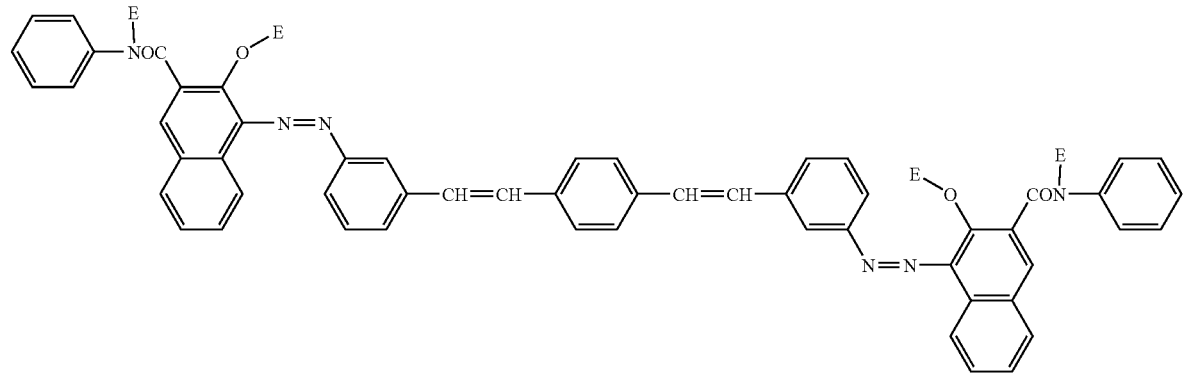
(V-3)
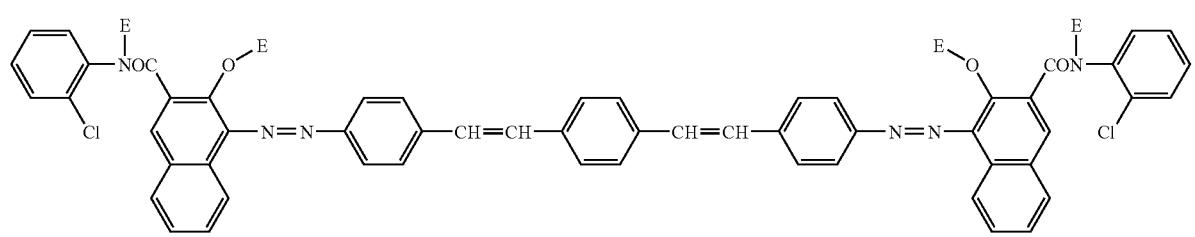
(V-4)
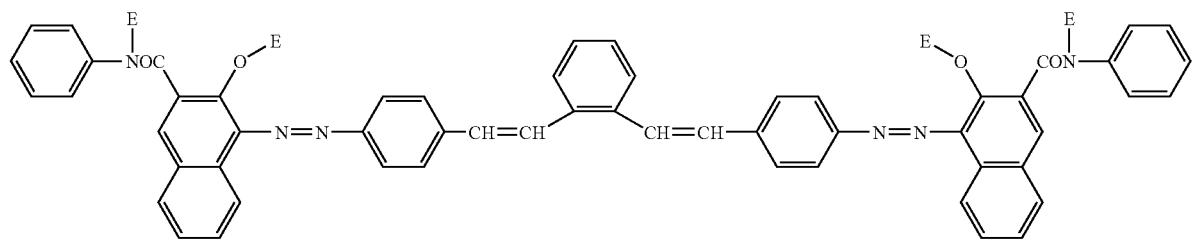
(V-5)
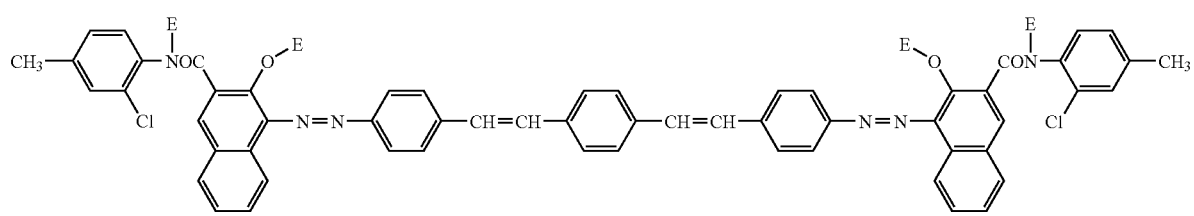
(V-6)
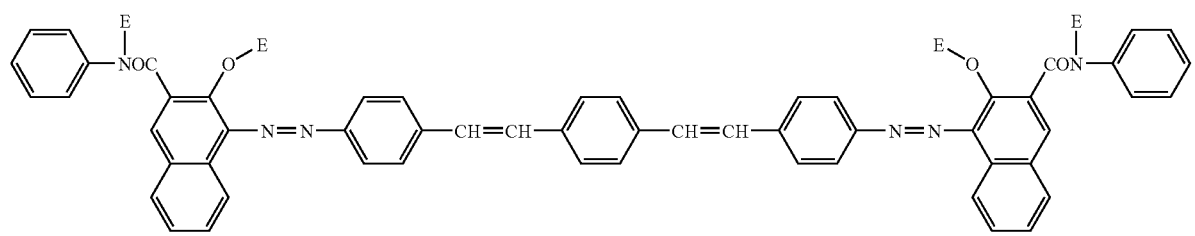
(V-7)

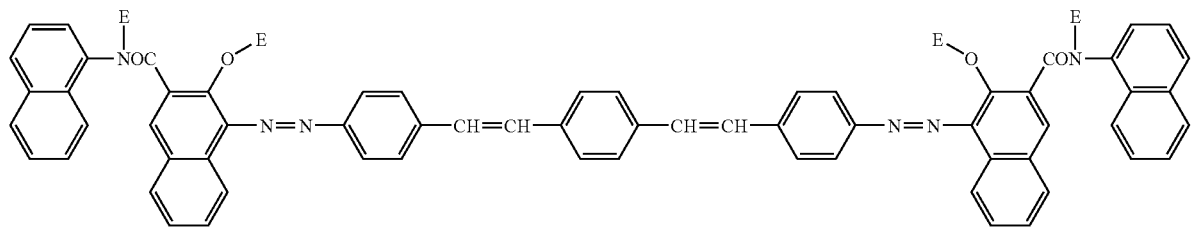
(V-8)
Specific examples of the azo compounds having the formula (VI) include compounds having the following formulae (VI)-1 to (VI)-5.
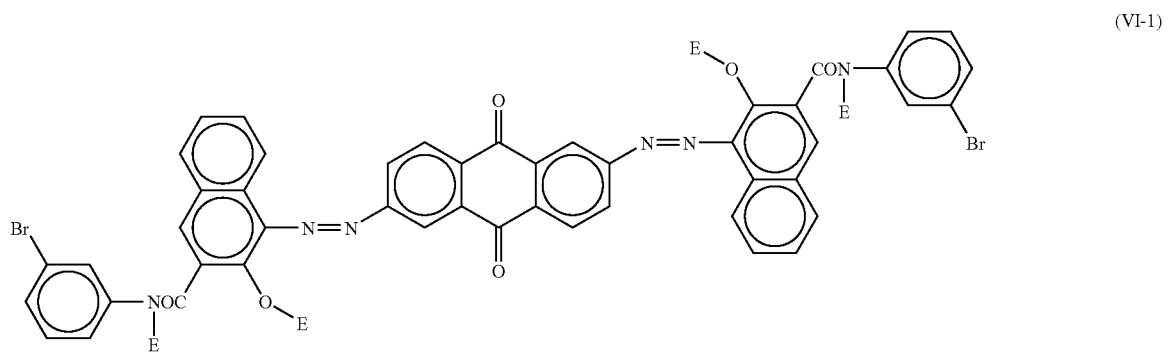
(VI-1)
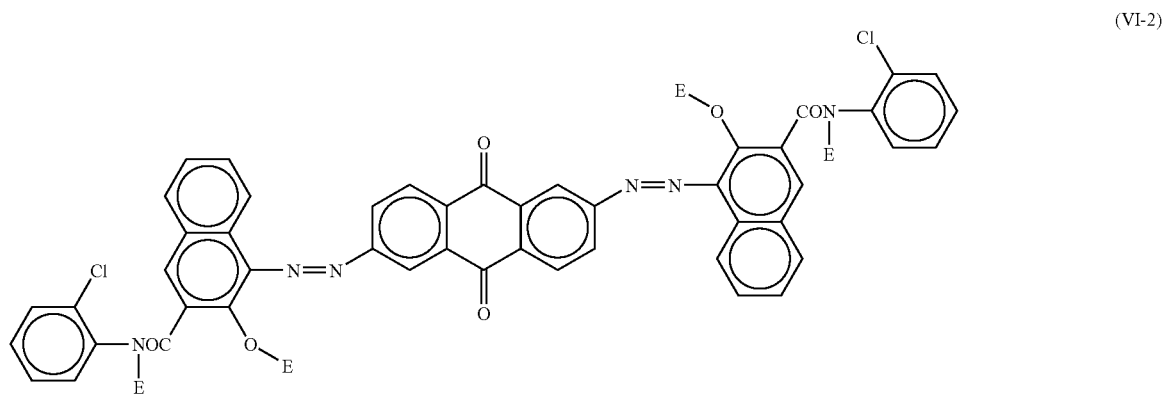
(VI-2)
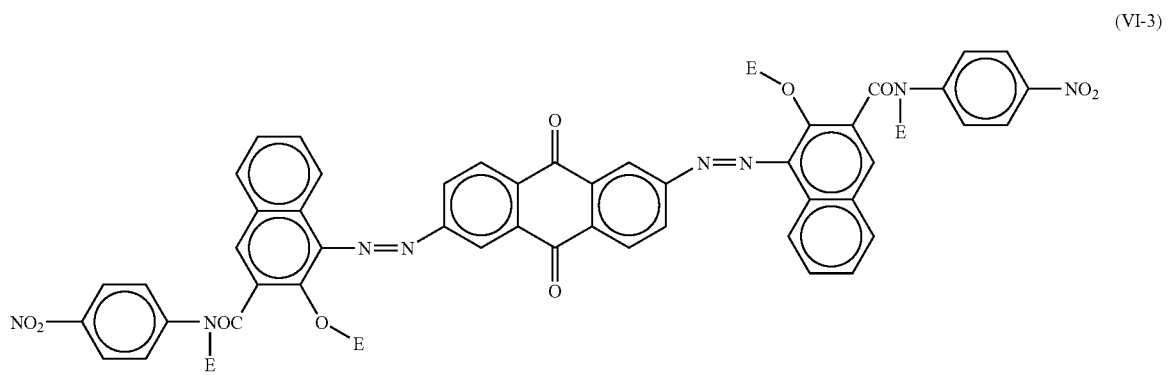
(VI-3)

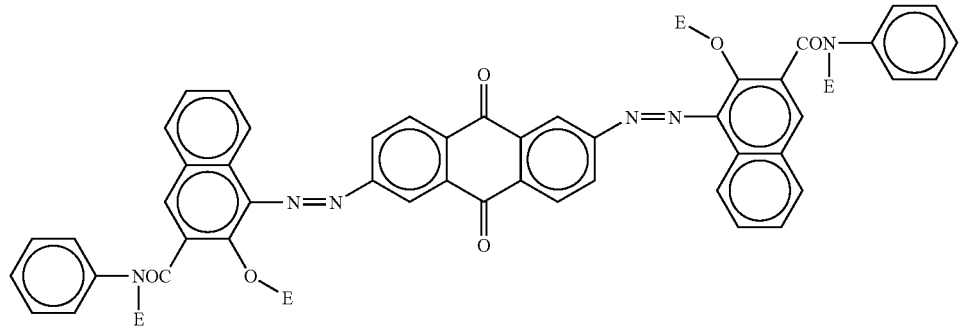
(VI-4)
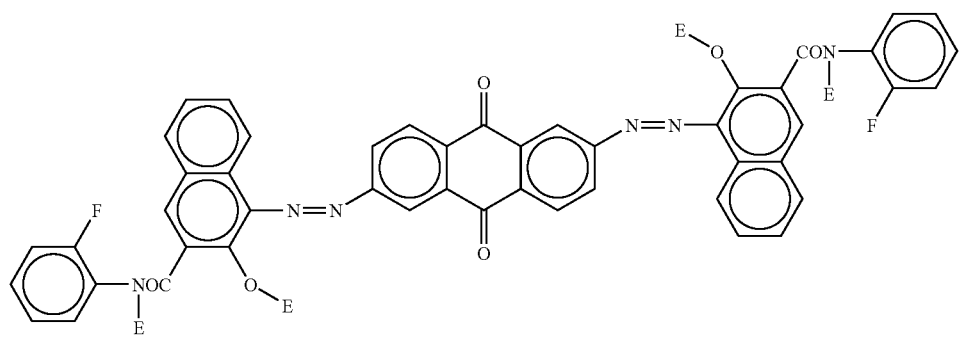
(VI-5)
Specific examples of the azo compounds having the formula (VII) include compounds having the following formulae (VII)-1 to (VII)-7.
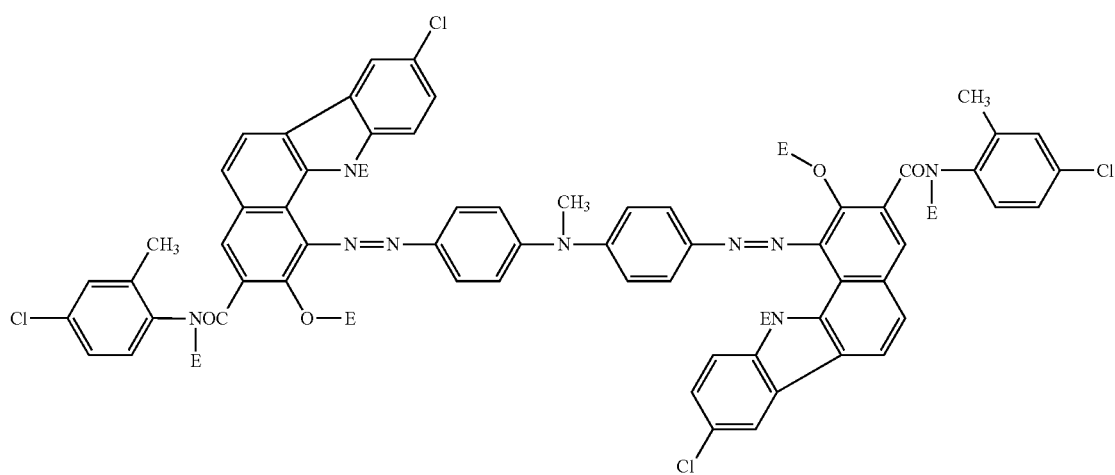
(VII-1)

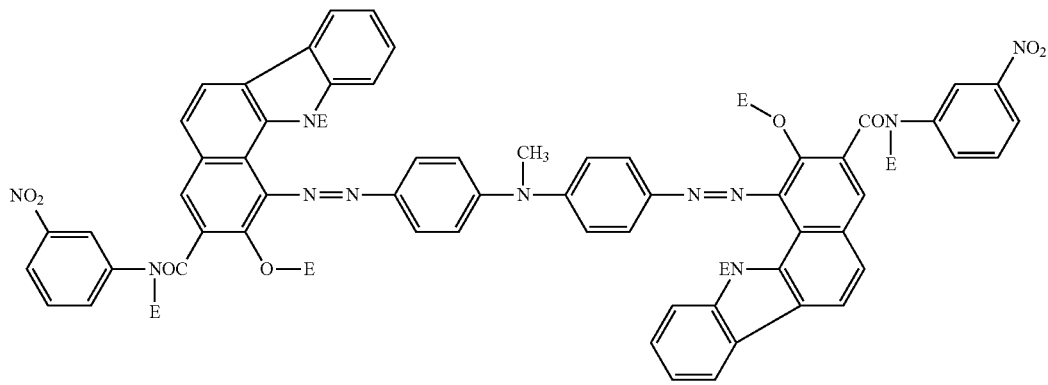
(VII-2)
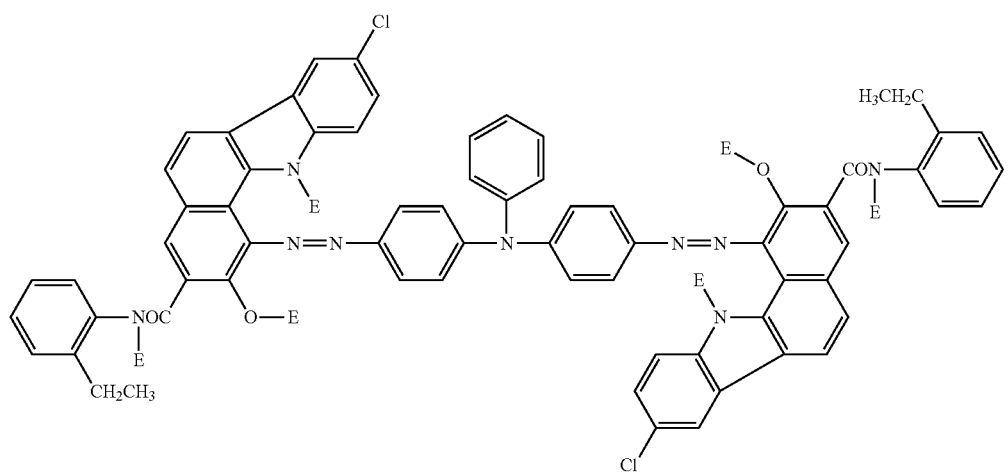
(VII-3)
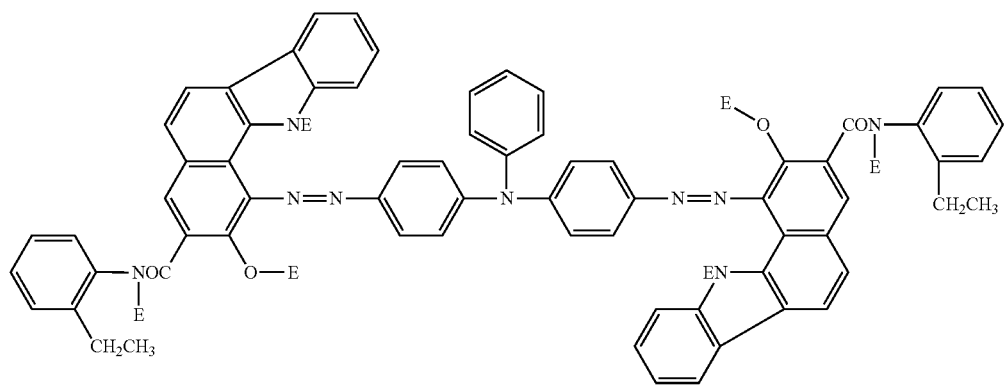
(VII-4)
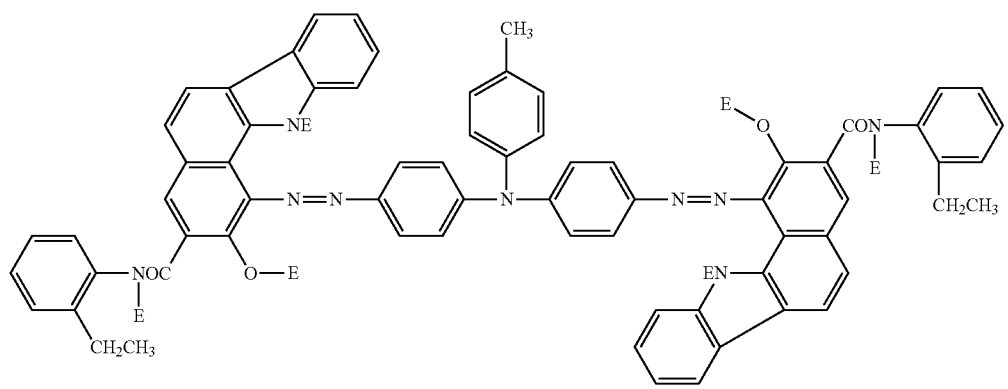
(VII-5)

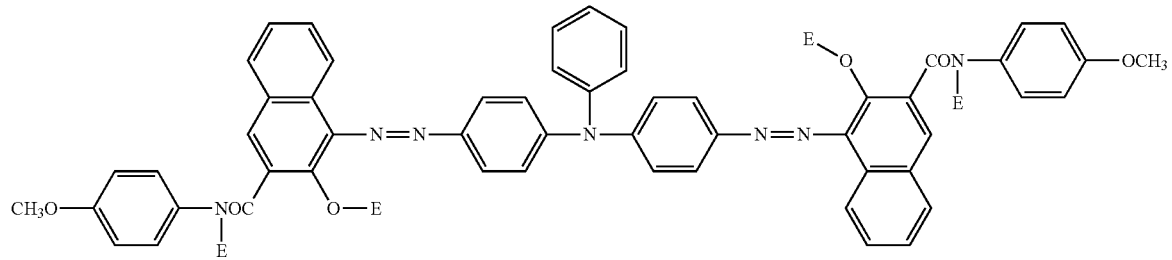
(VII-6)
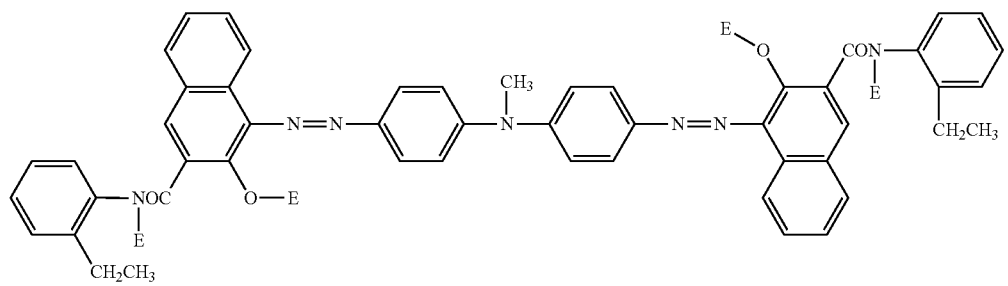
(VII-7)
Specific examples of the azo compounds having the formula (VIII) include compounds having the following formulae (VIII)-1 to (VIII)-5.
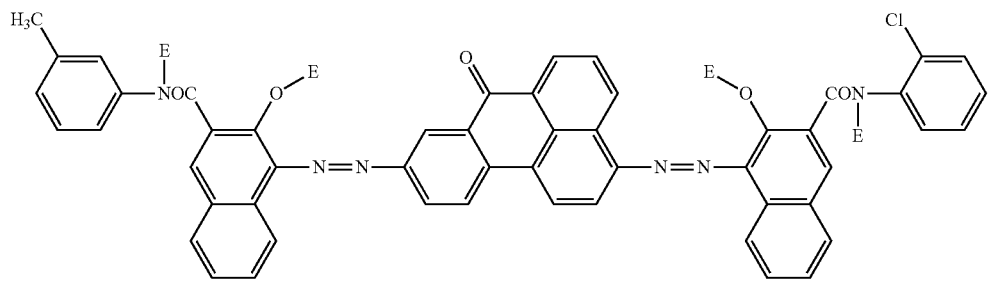
(VIII-1)
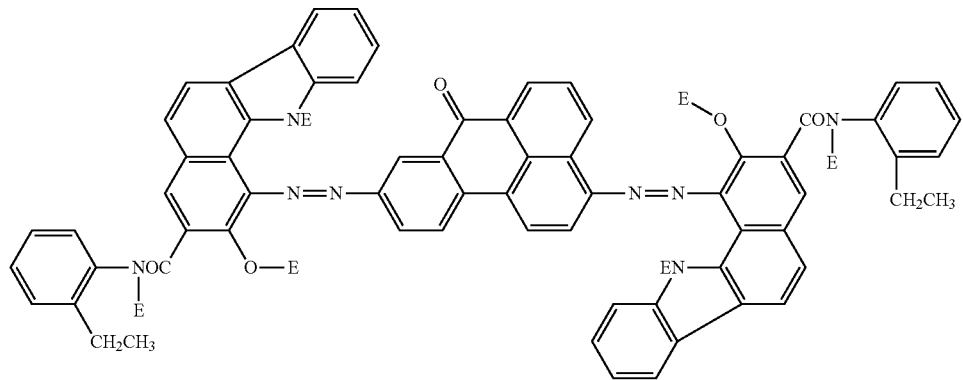
(VIII-2)

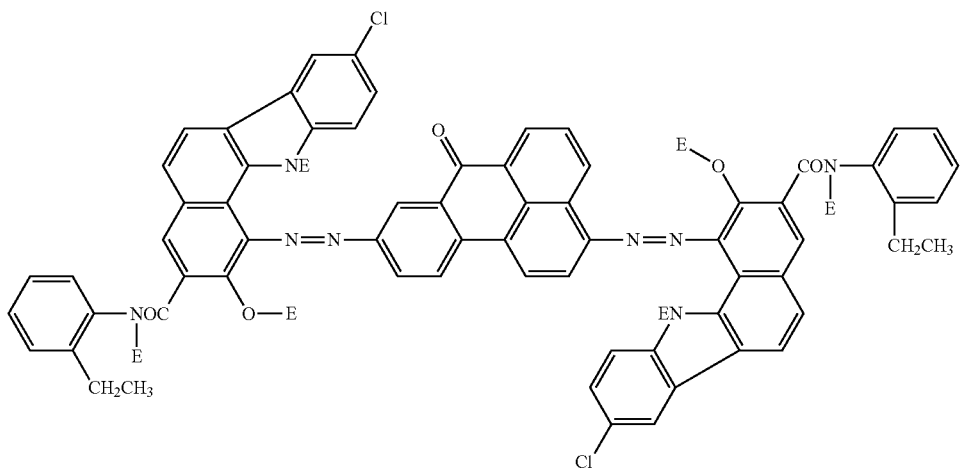
(VIII-3)
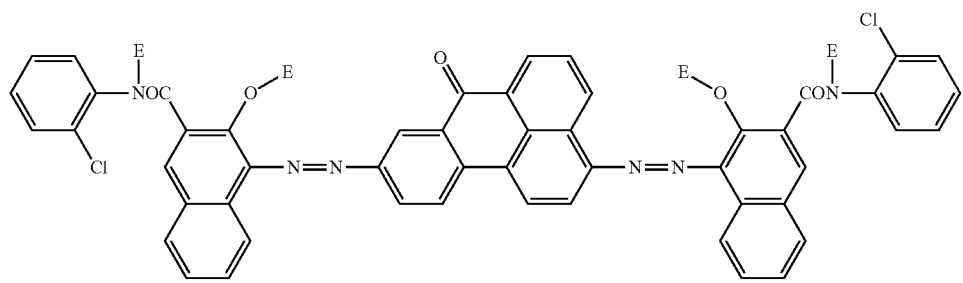
(VIII-4)
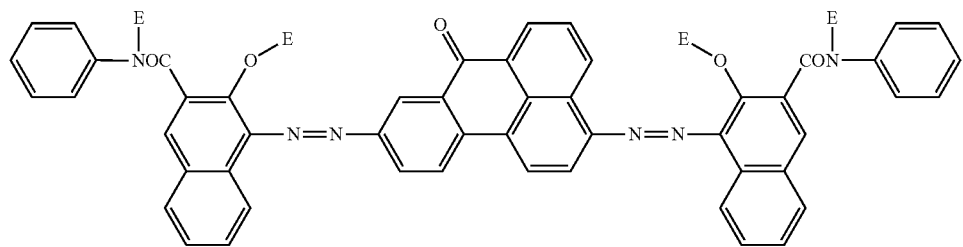
(VIII-5)
Specific examples of the azo compounds having the formula (IX) include compounds having the following formulae (IX)-1 to (IX)-4.
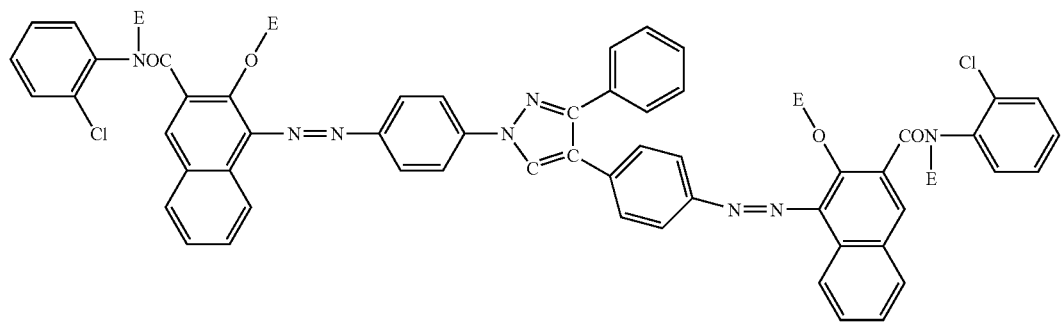
(IX-1)

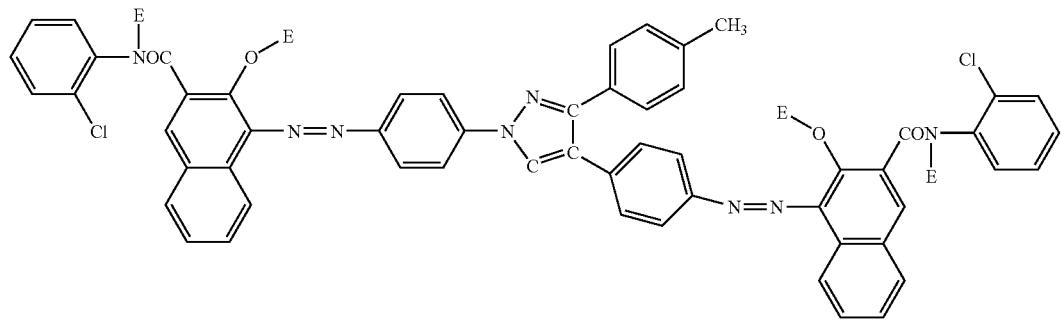
(IX-2)
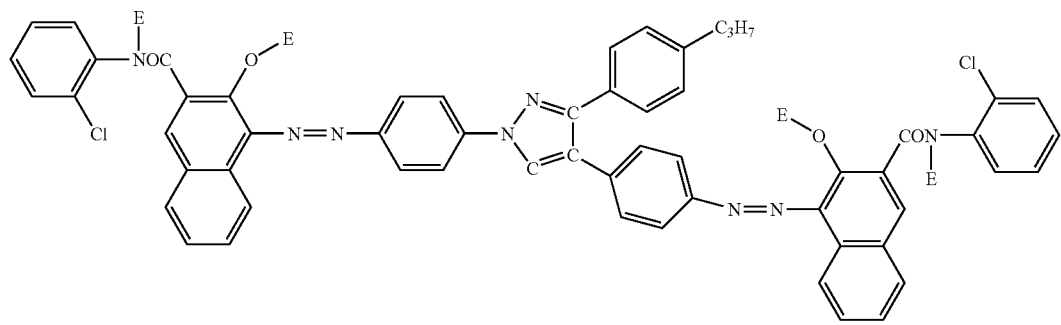
(IX-3)
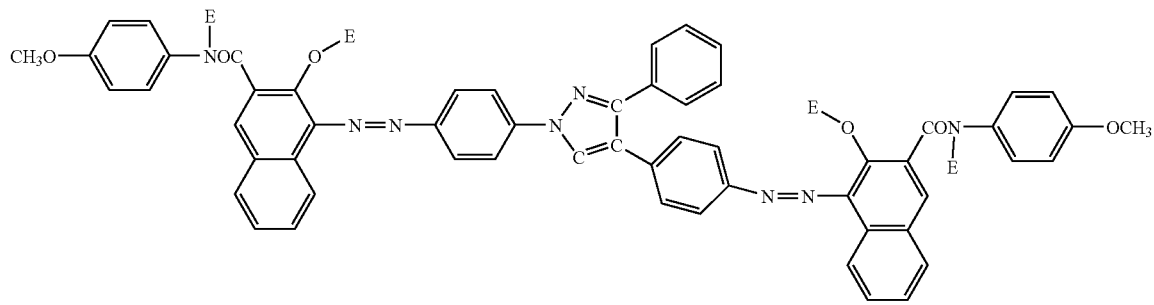
(IX-4)
Specific examples of the azo compounds having the formula (X) include compounds having the following formulae (X)-1 to (X)-6.
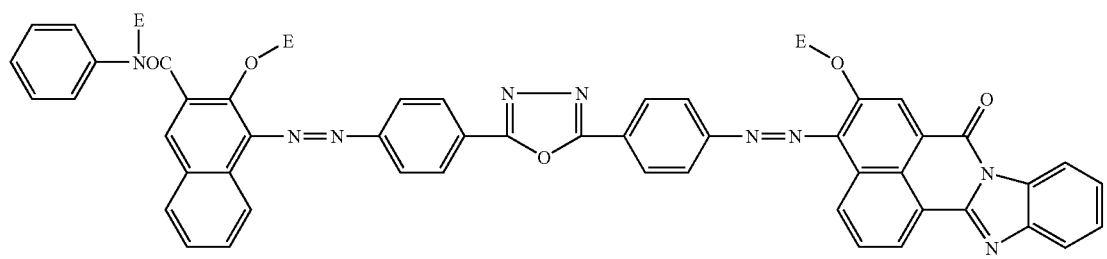
(X-1)

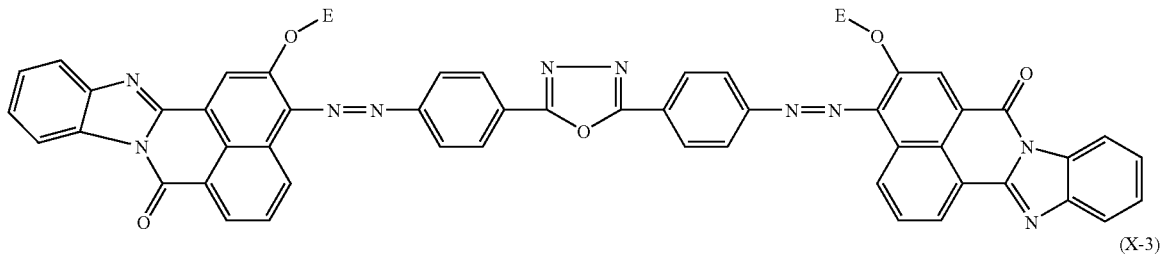

(X-2)

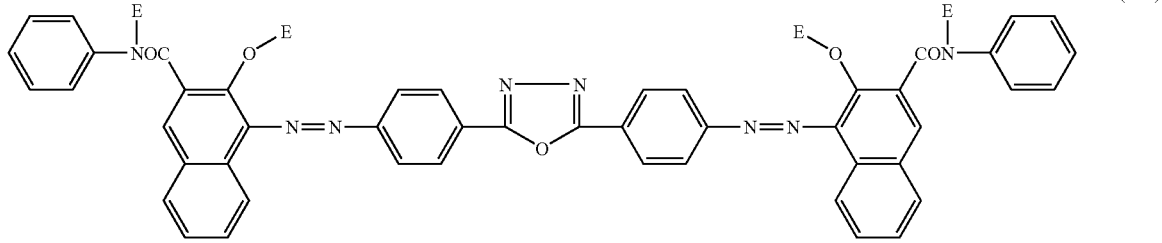

(X-3)

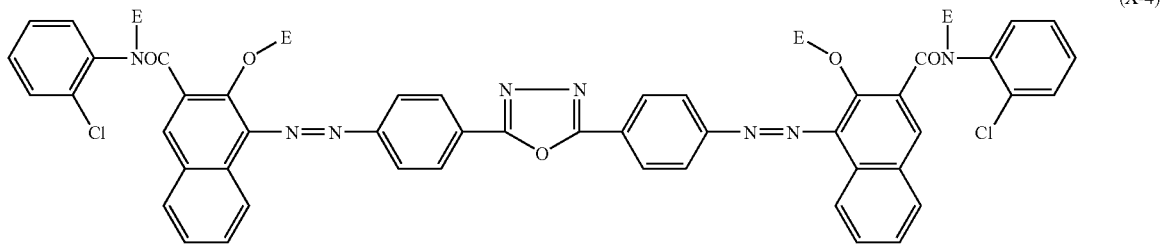

(X-4)

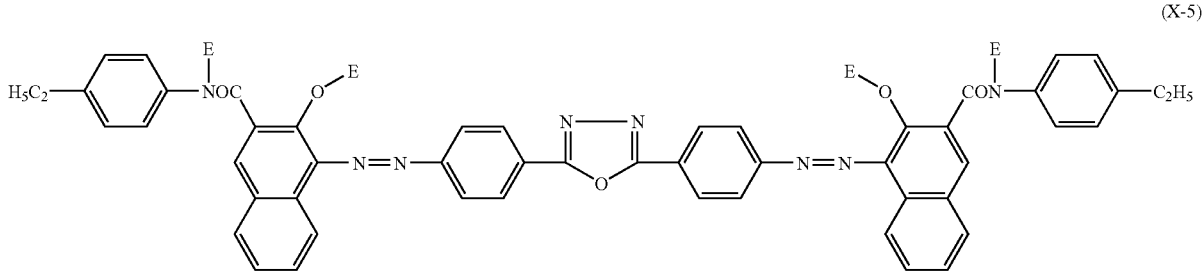

(X-5)

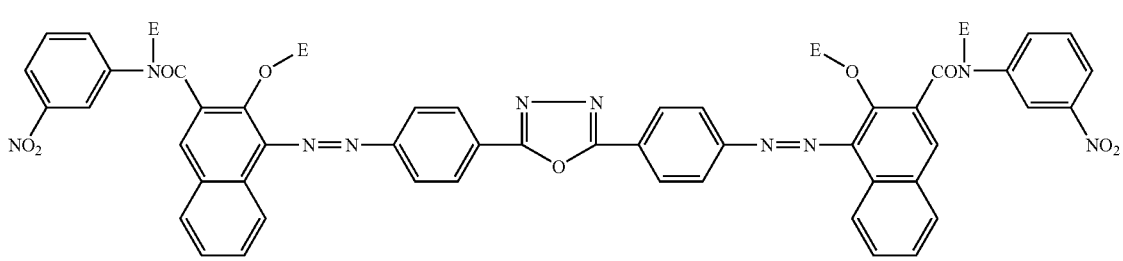

(X-6)

Azo compounds having a carboester group represented by the formula (I) may be synthesized according to the methods written in unexamined published Japanese patent application No. 2009-007523, e.g., a compound represented by the formula (a) having a residue of an azo compound represented by the formula (II) and a pyrocarbonate derivatives represented by the following formula (c) are reacted each other at a proper molar ratio in an aprotic organic solvent at from 0 to 150° C., preferably from 10 to 100° C. for 30 minutes to 20 hours under the presence of a base as a catalyst.

R1-O—C(=O)—O—C(=O)—O—R1        (c)

wherein R1 represents a substituted or unsubstituted alkyl group preferably having 3 to 15 carbon atoms and also preferably having 4 to 10 carbon atoms, a substituted or unsubstituted alkenyl group preferably having 3 to 15 carbon atoms and also preferably having 4 to 10 carbon atoms, a substituted or unsubstituted alkynyl group preferably having 3 to 15 carbon atoms and also preferably having 4 to 10 carbon atoms, a substituted or unsubstituted cycloalkyl group preferably having 3 to 15 carbon atoms and also preferably having 4 to 10 carbon atoms, a substituted or unsubstituted cycloalkenyl group preferably having 3 to 15 carbon atoms and also preferably having 4 to 10 carbon atoms, a substituted or unsubstituted aralkyl group preferably having 3 to 15 carbon atoms and also preferably having 4 to 10 carbon atoms.

In the synthesizing mentioned above, the appropriate mole ratio may be decided depending on the number of E groups introduced to an azo compound represented by the formula (I). The E group represents a carboester group represented by the following formula (b).

—C(=O)—O—R1 (b)

It is preferable to apply pyrocarbonate derivatives to a surplus.

Specific examples of the aprotic organic solvent include ether solvents such as tetrahydrofuran and dioxane; glycol ether solvents such as ethyleneglycolmethylether and ethyleneglycolethylether; acetonitrile; N,N-dimethylformamide; N,N-dimethylacetoamide; ethylcellosolve; ethylacetate; methylacetate; dichloromethane; dichloroethane; monochlorobenzene; toluene; xylene; nitrobenzene; pyridine; picoline; quinoline; etc. Among these solvents, pyridine, tetrahydrofuran, N,N-dimethylformamide and N,N-dimethylacetoamide are preferably used.

Specific examples of the base as a catalyst include alkali metals such as sodium, kalium, and their hydroxides and carbonates; alkali metal amides such as sodium amide and kalium amide; and hydrogenated alkali metals such as hydrogenated lithium; organic aliphatic, aromatic or heterocyclic N-bases such as diazabicyclooctene, diazabicycloundecene, 4-dimethylaminopyridine, dimethylpyridine, pyridine and triethylamine. Among these bases, organic N-bases such as 4-dimethylaminopyridine, dimethylpyridine and pyridine are preferably used.

Pyrocarbonate derivatives represented by the formula (c) may be produced by a known method or may have by purchasing. R1 in the formula (c) is explained above, it is preferable that R1 represents a branched alkyl group, because solubility to organic solvent can be improved.

In the present invention, by decarboesterifying using a liquid mixture complising not only an azo compound having a carboester group represented by the formula (I), but also another azo compound having a carboester group represented by the formula (I) and/or coexistence of another pigment, a complex-azo pigment can be provided.

As another pigments preferably for use in the present invention, for example azo pigments, phthalocyanine pigments, condensed polycyclic pigments, fullerene, carbon nanotube or inorganic nanopigments may be used.

As phthalocyanine pigments, non-metallic phthalocyanines, titanylphthalocyanine, oxyvanadium phthalocyanine, chloroaluminum phthalocyanine, chlorogallium phthalocyanine, chloroindium phthalocyanine, hydroxygallium phthalocyanine, copper phthalocyanine, zinc phthalocyanine, lead phthalocyanine, dichlorotin phthalocyanine, dichlorosilicon phthalocyanine, dihydroxysilicon phthalocyanine can be used.

As condensed polycyclic pigments, perylene pigments, quinacridone pigments, anthanthrone pigments can be used. In addition, fullerene, carbon nanotube or inorganic nanopigments may be preferably used. As inorganic nanopigments, zinc oxide, titanium oxide, silicon, silica, selenium, cadmium sulfide, cadmium selenate can be use.

These another pigments are preferably used as fine particles, so that they can interact with a component of a complex-azo pigment at the molecule scale level. Specifically, it is preferable that the particles have a particle diameter 1 μm or less, further preferable 0.1 μm or less. Appropriate range of rate for mixing an azo compound having a carboester group represented by the formula (I) and another pigment coexisted with the azo compound is 100:1 to 1:100 by weight, preferably 90:10 to 10:90.

Combination of complex-azo pigments, a pigment having a character as a P-type semiconductor or a pigment having a structure or a substituent of donor group, and a pigment having a character as a N-type semiconductor or a pigment having a structure or a substituent of acceptor group is preferable to produce an excellent photoreceptor which has sufficient sensitivity and stable electrostatic properties, because complex components of pigments can interact at the molecule level. For example, a combination of a phthalocyanine pigment having a character as a P-type semiconductor with an azo compound (azo pigment) manufactured by decarboesterifying of an azo compound having a carboester group and also having a structure of acceptor group represented by the formula (III), formula (VI) or formula (VIII), and a combination of a condensed polycyclic pigment or fullerene having a character as a N-type semiconductor with an azo compound (azo pigment) manufactured by decarboesterifying of an azo compound having a carboester group and also having a structure of donor group represented by the formula (IV) or formula (VII) are preferably used.

A complex-azo pigment in the present invention may be produced by the following methods.

As explained above, according to the present invention, a complex-azo pigment in the present invention is manufactured by the following methods. Converting into a compound represented by the formula (a) by decarboesterifying an azo compound having a carboester group represented by the formula (I) and/or coexistence of another pigment by chemically means, thermally means or photolytically means, so an azo compound (azo pigment) with another pigment form complex at the molecule level.

As another pigments, for example azo pigments, phthalocyanine pigments, condensed polycyclic pigments, fullerene, carbon nanotube or inorganic nanopigments may be coexisted and plural azo compounds having a carboester group represented by the formula (I) may be applied.

Chemically means, thermally means or photolytically means used for decarboesterifying in the present invention is applied as follows.

Chemically means is a method for producing an azo pigment by decarboesterifying an azo compound having a carboester group using acid or base. It is preferable to use an acid as catalyst, for example acetic acid, trifluoroacetic acid, propionic acid, acrylic acid, benzoic acid, hydrochloric acid, sulfuric acid, boracic acid, p-toluene sulfonic acid, salicylic acid.

Tharmal means is a method for producing an azo pigment by decarboesterifying an azo compound having a carboester group heating 50 to 300° C. in the presence of solvent or no solvent. It's further preferable to heat 70 to 250° C. for 30 minutes to 20 hours under normal pressure.

Photolytically means can be used when an azo compound having a carboester group has a property of absorbing light. High pressure or a low pressure mercury lamp, a tungsten lamp, an LED lamp and a laser light source can be used.

Specific examples of the organic solvent for the liquid mixture include ether solvents such as tetrahydrofuran and dioxane; glycol ether solvents such as ethyleneglycolmethylether and ethyleneglycolethylether; butanol; N,N-dimethylformamide; N,N-dimethylacetoamide; ethylcellosolve; ethylacetate; butylacetate; monochlorobenzene; dichlorobenzene; toluene; xylene; anisole; cyclohexanone; nitrobenzene; pyridine; picoline; quinoline; etc.

A combination of the chemically means, thermally means or the photolytically means can more efficiently prepare an azo pigment. Particularly, a combination of the chemically means and the thermally means can prepare a high-purity azo pigment at a high yield.

Pigments coexisted in the liquid mixture are preferably used as fine particles. It is preferable that the particles have a particle diameter 0.1 μm or less by a mechanical crush method, a reprecipitation technique or a method of microparticulation from a vapor phase.

By the process of adding the pigments into a solution comprising an azo compound having a carboester group dissolved in an organic solvent and stirring, the azo compound can contact to the added pigments at the molecule scale. Under this condition, a complex-azo pigment of the present invention can be provided by decarboesterifying using at least any one of means selected from chemically means, thermally means and photolytically means.

As a preferable use of a complex-azo pigment, after mixing and stirring the solution comprising an azo compound having a carboester group having the formula (I) dissolved in an organic solvent with the pigments, and making the azo compound can contact to the added pigments at the molecule level, film can be formed by a casting method or a spin coating, after that the organic solvent is removed and dried up, and then decarboesterifying is applied by chemically means, thermally means or photolytically means so that a complex-azo pigment of the present invention can be provided.

It is preferred that the azo compound having a carboester group represented by the formula (I) is dissolved in an organic solvent to provide a solution (i) and then removed impurities from the solution (i) by adsorption treatment using silicagel, alumina, florisil, activated carbon, activated soil, diatomaceous earth or perlite to provide a solution (ii), after that the solution (ii) may be applied in the liquid mixture.

Specific examples of the organic solvent include ether solvents such as tetrahydrofuran and dioxane; glycol ether solvents such as ethyleneglycolmethylether and ethyleneglycolethylether; N,N-dimethylformamide; N,N-dimethylacetoamide; ethylcellosolve; ethylacetate; butylacetate; dichloromethane; chloroform; carbon tetrachloride; dichloroethane; monochlorobenzene; dichlorobenzene; toluene; xylene; anisole; n-hexane; cyclohexanone; cyclohexane; nitrobenzene; pyridine; picoline; quinoline; and their combinations.

Specific method for the adsorption treatment includes using a column chromatography, adding an adsorbent material under room temperature or on heating and then filtering. And it is also preferable to combine recrystallization with the adsorption treatment for effective treatment.

A complex-azo pigment of the present invention is used for organic photoconductive materials, particularly as a charge generating material for various electrophotographic photoreceptors, e.g., (1) a single-layered photoreceptor formed of an electroconductive substrate and a photoconductive layer including a complex-azo pigment of the present invention, a binder resin and an optional sensitizer as main components on the electroconductive substrate; (2) the single-layered photoreceptor of (1), the photoconductive layer of which further includes a charge transporting material; (3) a multilayered photoreceptor formed of an electroconductive substrate, a charge generating layer including a complex-azo pigment of the present invention as a main component on the electroconductive substrate, and further a charge transporting layer including a charge transporting material and a binder resin as main components on the charge generating layer; and (4) the multilayered photoreceptor of (3), the charge generating layer and the charge transporting layer of which are reversely layered.

A complex-azo pigment of the present invention may be produced during the process for manufacturing a electrophotographic photoreceptor.

Firstly dissolve an azo compound having a carboester group represented by the formula (I) in an organic solvent and further dissolve another pigment for coexistence to provide a liquid mixture. Form a film comprising an azo compound and another pigment on a electroconductive substrate using the liquid mixture by casting method and then apply chemically means, thermally means or photolytically means to provide a charge generating layer having a complex-azo pigment of the present invention. After that a charge transporting layer having a charge transporting material and a binder resin is formed thereon to provide multilayer photoreceptors.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Example 1

An azo compound having carboester groups represented by the formula (III-3) synthesized as follows and a titanylphthalocyanine pigment were mixed to provide a liquid mixture, and then a complex-azo pigment was produced by decarboesterifying by chemically means and thermally means.

[Synthesis Example of the Azo Compound Having Carboester Groups Represented by the Formula (III-3)]

0.83 g of precursor of an azo compound having carboester groups represented by the formula (III-3) that means a compound represented by the formula (III-3) but its all E groups are H (hydrogen atom), 2.6 g (12 times mol) of pyrocarboxylic acid di-tert-butyl ester were dispersed in 150 ml of dehydrated pyridine, and after the dispersion was stirred for 15 minutes at room temperature, the dispersion was heated to have a temperature about 50° C. and reacted for 30 minutes. The dispersion gradually became reddish and a uniform solution was prepared. The solution was cooled to have a room temperature, and the solvent was removed. Then about 50 ml of ethyl acetate was added thereto to prepare 1.18 g of a red powder (yield rate: 95.3%). The red powder was further purified by column chromatogram (silica gel/chloroform).

Elemental analysis results of the synthesized compound (azo compound (III-3), (E: $C_5H_9O_2$)) are shown in Table 1. Calcd. (%) of each element was calculated as the synthesized compound has a structure represented by the formula (III-3) but its all carboester group (E group) are $C_5H_9O_2$, that means the azo compound has a chemical formula of $C_{67}H_{60}N_6O_{13}Cl_2$.

TABLE 1

| Element Analysis | C | H | N |
|---|---|---|---|
| Found. (%) | 65.53 | 4.98 | 7.04 |
| Calcd. (%) | 65.52 | 4.92 | 6.84 |

An absorption based on a saturated hydrocarbon by a substituent was observed at 2,980 cm−1 and an absorption based on a stretching vibration of carbonate C=O was observed at 1,760 cm−1 in an infrared absorption spectrum (KBr tablet method) of the powder.

[Complex-Azo Pigment Comprising an Azo Compound (III-3) Having all E Groups are H (Hydrogen Atom) and Titanylphthalocyanine Pigment]

0.98 g of the azo compound (III-3) (E: $C_5H_9O_2$) was dispersed in 100 ml of toluene and heated with stirring, and then a dark red-brown solution was prepared. 0.46 g of titanylphthalocyanine pigment was added in the dispersion, and then 0.9 g of trifluoroacetic acid and 0.5 g of water were added under strongly stirring, and reacted about 80° C. for 9 hours. After disappearance of the azo compound (III-3) was made sure using thin-layer chromatography, the dispersion was cooled to have a room temperature, and then the dispersion was filtered using a membrane filter having a pore diameter of 0.1 μm (Fluoropore of Sumitomo Electric Industries, Ltd.), after that the residue was rinsed with 100 ml of methanol twice, so that 1.05 g of dark mazarine powder was provided.

An absorption based on a saturated hydrocarbon by a substituent observed from the azo compound (III-3) at 2,980 cm−1 was disappeared from the prepared dark mazarine powder, and also an absorption based on a stretching vibration of carbonate C=O at 1,760 cm−1 was disappeared in an infrared absorption spectrum (KBr tablet method) of the powder.

Example 2

An azo compound having carboester groups represented by the formula (III-2) synthesized as follows and a titanylphthalocyanine pigment were mixed to provide a liquid mixture, and then a complex-azo pigment was produced by decarboesterifying by chemically means and thermally means.

[Synthesis Example of the Azo Compound Having Carboester Groups Represented by the Formula (III-2)]

1.61 g of precursor of an azo compound having carboester groups represented by the formula (III-2) that means a compound represented by the formula (III-2) but its all E groups are H (hydrogen atom), 4.3 g (10 times mol) of pyrocarboxylic acid di-tert-butyl ester were dispersed in 50 ml of dehydrated pyridine and 200 ml of dehydrated N,N-dimethylformamide, and after the dispersion was stirred for 15 minutes at room temperature, the dispersion was heated to have a temperature about 50° C. and reacted for 2 hours. The dispersion gradually became reddish and a uniform solution was prepared. The solution was cooled to have a room temperature, and the solvent was removed. Then about 100 ml of ethyl acetate was added thereto to prepare 2.24 g of a red powder (yield rate: 93%).

Elemental analysis results of the synthesized compound (azo compound (III-2), (E: $C_5H_9O_2$)) are shown in Table 2. Calcd. (%) of each element was calculated as the synthesized compound has a structure represented by the formula (III-2) but its all carboester group (E group) are $C_5H_9O_2$, that means the azo compound has a chemical formula of $C_{68}H_{63}N_6O_{13}Cl$.

TABLE 2

| Element Analysis | C | H | N |
|---|---|---|---|
| Found. (%) | 67.18 | 5.09 | 6.84 |
| Calcd. (%) | 67.63 | 5.26 | 6.96 |

An absorption based on a saturated hydrocarbon by a substituent was observed at 2,980 cm−1 and an absorption based on a stretching vibration of carbonate C=O was observed at 1,760 cm−1 in an infrared absorption spectrum (KBr tablet method) of the powder.

[Complex-Azo Pigment Comprising an Azo Compound (III-2) Having all E Groups are H (Hydrogen Atom) and Titanylphthalocyanine Pigment]

0.97 g of the azo compound (III-2) (E: $C_5H_9O_2$) was dispersed in 100 ml of toluene and heated with stirring, and then a dark red-brown solution was prepared. 0.46 g of titanylphthalocyanine pigment was added in the dispersion, and then 1.8 g of trifluoroacetic acid and 1.0 g of water were added under strongly stirring, and reacted about 80° C. for 9 hours. After disappearance of the azo compound (III-2) was made sure using thin-layer chromatography, the dispersion was cooled to have a room temperature, and then the dispersion was filtered using a membrane filter having a pore diameter of 0.1 μm (Fluoropore of Sumitomo Electric Industries, Ltd.), after that the residue was rinsed with 100 ml of methanol twice, so that 1.04 g of dark mazarine powder was provided.

An absorption based on a saturated hydrocarbon by a substituent observed from the azo compound (III-2) at 2,980 cm−1 was disappeared from the prepared dark mazarine powder, and also an absorption based on a stretching vibration of carbonate C=O at 1,760 cm−1 was disappeared in an infrared absorption spectrum (KBr tablet method) of the powder.

Example 3

An azo compound having carboester groups represented by the formula (III-3) synthesized according to Example 1 and a quinacridone pigment were mixed to provide a liquid mixture, and then a complex-azo pigment was produced by decarboesterifying.

[Complex-Azo Pigment Comprising an Azo Compound (III-3) Having all E Groups are H (Hydrogen Atom) and Quinacridone Pigment]

0.98 g of the azo compound (III-3) (E: $C_5H_9O_2$) was dispersed in 100 ml of toluene and heated with stirring, and then a dark red-brown solution was prepared. 0.25 g of quinacridone pigment was added in the dispersion, and then 1.83 g of trifluoroacetic acid was added under strongly stirring, and reacted about 80° C. for 4.5 hours. After disappearance of the azo compound (III-3) was made sure using thin-layer chromatography, the dispersion was cooled to have a room temperature, and then the dispersion was filtered using a membrane filter having a pore diameter of 0.1 μm (Fluoropore of Sumitomo Electric Industries, Ltd.), after that the residue was rinsed with 100 ml of methanol twice, so that 1.05 g of dark mazarine powder was provided.

An absorption based on a saturated hydrocarbon by a substituent observed from the azo compound (III-3) at 2,980 cm−1 was disappeared from the prepared dark mazarine powder, and also an absorption based on a stretching vibration of carbonate C=O at 1,760 cm−1 was disappeared in an infrared absorption spectrum (KBr tablet method) of the powder.

Example 4

An azo compound having carboester groups represented by the formula (III-3) synthesized according to Example 1 and an azo compound having carboester groups represented by the formula (III-4) were mixed to provide a liquid mixture, and then a complex-azo pigment was produced by decarboesterifying.

[Synthesis Example of the Azo Compound Having Carboester Groups Represented by the Formula (III-4)]

0.79 g of precursor of an azo compound having carboester groups represented by the formula (III-4) that means a compound represented by the formula (III-4) but its all E groups are H (hydrogen atom), 2.6 g (12 times mol) of pyrocarboxylic acid di-tert-butyl ester were dispersed in 150 ml of dehydrated pyridine, and after the dispersion was stirred for 15 minutes at room temperature, the dispersion was heated to have a temperature about 50° C. and reacted for 30 minutes. The dispersion gradually became reddish and a uniform solution was prepared. The solution was cooled to have a room temperature, and the solvent was removed. Then about 50 ml of ethyl acetate was added thereto to prepare 1.02 g of a red powder (yield rate: 85.6%).

Elemental analysis results of the synthesized compound (azo compound (III-4) (E: $C_5H_9O_2$)) are shown in Table 3. Calcd. (%) of each element was calculated as the synthesized compound has a structure represented by the formula (III-4) but its all carboester group (E group) are $C_5H_9O_2$, that means the azo compound has a chemical formula of $C_{69}H_{66}N_6O_{13}$.

TABLE 3

| Element Analysis | C | H | N |
| --- | --- | --- | --- |
| Found. (%) | 69.69 | 5.55 | 7.05 |
| Calcd. (%) | 69.80 | 5.60 | 7.08 |

An absorption based on a saturated hydrocarbon by a substituent was observed at 2,980 cm−1 and an absorption based on a stretching vibration of carbonate C═O was observed at 1,760 cm−1 in an infrared absorption spectrum (KBr tablet method) of the powder.

[Complex-Azo Pigment Comprising an Azo Compound (III-3) Having all E Groups are H (Hydrogen Atom) and an Azo Compound (III-4) Having all E Groups are H (Hydrogen Atom)]

0.98 g of the azo compound (III-3) (E: $C_5H_9O_2$) synthesized according to Example 1 and 0.95 g of the azo compound (III-4) (E: $C_5H_9O_2$) were dispersed in 200 ml of toluene and heated with stirring, and then a dark red-brown solution was prepared. 1.8 g of trifluoroacetic acid was added and reacted for 5 hours under reflux. After disappearance of the azo compound (III-3) and (III-4) was made sure using thin-layer chromatography, the dispersion was cooled to have a room temperature, and then the dispersion was filtered using a membrane filter having a pore diameter of 0.1 μm (Fluoropore of Sumitomo Electric Industries, Ltd.), after that the residue was rinsed with 200 ml of methanol twice, so that 1.2 g of dark mazarine powder was provided.

An absorption based on a saturated hydrocarbon by a substituent observed from the azo compound (III-3) and (III-4) at 2,980 cm−1 was disappeared from the prepared dark mazarine powder, and also an absorption based on a stretching vibration of carbonate C═O at 1,760 cm−1 was disappeared in an infrared absorption spectrum (KBr tablet method) of the powder.

Example 5

An azo compound having carboester groups represented by the formula (III-2) synthesized according to Example 2 and an azo compound having carboester groups represented by the formula (V-1) were mixed to provide a liquid mixture, and then a complex-azo pigment was produced by decarboesterifying.

[Synthesis Example of the Azo Compound Having Carboester Groups Represented by the Formula (V-1)]

0.92 g of precursor of an azo compound having carboester groups represented by the formula (V-1) that means a compound represented by the formula (V-1) but its all E groups are H (hydrogen atom), 2.6 g (12 times mol) of pyrocarboxy-lic acid di-tert-butyl ester were dispersed in 150 ml of dehydrated pyridine, and after the dispersion was stirred for 15 minutes at room temperature, the dispersion was heated to have a temperature about 50° C. and reacted for 40 minutes. The dispersion gradually became reddish and a uniform solution was prepared. The solution was cooled to have a room temperature, and the solvent was removed. Then about 50 ml of ethyl acetate was added thereto to prepare 1.16 g of a red powder (yield rate: 88.0%). The red powder was further purified by column chromatogram (silica gel/chloroform).

Elemental analysis results of the synthesized compound (azo compound (V-1) (E: $C_5H_9O_2$)) are shown in Table 4. Calcd. (%) of each element was calculated as the synthesized compound has a structure represented by the formula (V-1) but its all carboester group (E group) are $C_5H_9O_2$, that means the azo compound has a chemical formula of $C_{80}H_{80}N_6O_{12}$.

TABLE 4

| Element Analysis | C | H | N |
| --- | --- | --- | --- |
| Found. (%) | 72.69 | 6.03 | 6.45 |
| Calcd. (%) | 72.93 | 6.12 | 6.38 |

An absorption based on a saturated hydrocarbon by a substituent was observed at 2,980 cm−1 and an absorption based on a stretching vibration of carbonate C═O was observed at 1,760 cm−1 in an infrared absorption spectrum (KBr tablet method) of the powder.

[Complex-Azo Pigment Comprising an Azo Compound (III-2) Having all E Groups are H (Hydrogen Atom) and an Azo Compound (V-1) Having all E Groups are H (Hydrogen Atom)]

0.97 g of the azo compound (III-2) (E: $C_5H_9O_2$) synthesized according to Example 2 and 1.05 g of the azo compound (V-1) (E: $C_5H_9O_2$) were dispersed in 150 ml of chlorobenzene and heated with stirring, and then a dark red-brown solution was prepared. 0.9 g of trifluoroacetic acid was added under strongly stirring, and reacted for 3 hours under reflux. After disappearance of the azo compound (III-2) and (V-1) was made sure using thin-layer chromatography, the dispersion was cooled to have a room temperature, and then the dispersion was filtered using a membrane filter having a pore diameter of 0.1 μm (Fluoropore of Sumitomo Electric Industries, Ltd.), after that the residue was rinsed with 200 ml of methanol twice, so that 1.27 g of dark mazarine powder was provided.

An absorption based on a saturated hydrocarbon by a substituent observed from the azo compound (III-2) and (V-1) at 2,980 cm−1 was disappeared from the prepared dark mazarine powder, and also an absorption based on a stretching vibration of carbonate C═O at 1,760 cm−1 was disappeared in an infrared absorption spectrum (KBr tablet method) of the powder.

Example 6

An azo compound having carboester groups represented by the formula (IV-1) synthesized as follows and a metal-free phthalocyanine pigment were mixed to provide a liquid mixture, and then a complex-azo pigment was produced by decarboesterifying.

[Synthesis Example of the Azo Compound Having Carboester Groups Represented by the Formula (IV-1)]

2.93 g of precursor of an azo compound having carboester groups represented by the formula (IV-1) that means a compound represented by the formula (IV-1) but its all E groups are H (hydrogen atom), 6.5 g (15 times mol) of pyrocarboxylic acid di-tert-butyl ester were dispersed in 250 ml of dehydrated pyridine, and after the dispersion was stirred for 15 minutes at room temperature, the dispersion was heated to have a temperature about 40° C. and reacted for 40 minutes. The dispersion gradually became reddish and a uniform solution was prepared. The solution was cooled to have a room temperature, and the solvent was removed. Then about 100 ml of cyclohexane was added thereto to prepare 2.91 g of a red powder (yield rate: 71%).

Elemental analyses results of the synthesized compound (azo compound (IV-1) (E: $C_5H_9O_2$)) are shown in Table 5. Calcd. (%) of each element was calculated as the synthesized compound has a structure represented by the formula (IV-1) but its all carboester group (E group) are $C_5H_9O_2$, that means the azo compound has a chemical formula of $C_{138}H_{141}N_{13}O_{24}$.

TABLE 5

| Element Analysis | C | H | N |
|---|---|---|---|
| Found. (%) | 70.55 | 6.17 | 8.00 |
| Calcd. (%) | 70.06 | 6.01 | 7.70 |

An absorption based on a saturated hydrocarbon by a substituent was observed at 2,980 cm−1 and an absorption based on a stretching vibration of carbonate C=O was observed at 1,760 cm−1 in an infrared absorption spectrum (KBr tablet method) of the powder.

[Complex-Azo Pigment Comprising an Azo Compound (IV-1) Having all E Groups are H (Hydrogen Atom) and Metal-Free Phthalocyanine Pigment]

1.89 g of the azo compound (IV-1) (E: $C_5H_9O_2$) was dispersed in 150 ml of xylene and heated with stirring, and then a dark red-brown solution was prepared. 0.82 g of metal-free phthalocyanine pigment was added in the dispersion, and then 0.9 g of trifluoroacetic acid and 0.5 g of water were added under strongly stirring, and reacted about 100° C. for 7 hours. After disappearance of the azo compound (IV-1) was made sure using thin-layer chromatography, the dispersion was cooled to have a room temperature, and then the dispersion was filtered using a membrane filter having a pore diameter of 0.1 µm (Fluoropore of Sumitomo Electric Industries, Ltd.), after that the residue was rinsed with 100 ml of acetone twice, so that 1.65 g of dark mazarine powder was provided.

An absorption based on a saturated hydrocarbon by a substituent observed from the azo compound at 2,980 cm−1 was disappeared from the prepared dark mazarine powder, and also an absorption based on a stretching vibration of carbonate C=O at 1,760 cm−1 was disappeared in an infrared absorption spectrum (KBr tablet method) of the powder.

Example 7

An azo compound having carboester groups represented by the formula (VI-1) synthesized as follows and a chlorogallium phthalocyanine pigment were mixed to provide a liquid mixture, and then a complex-azo pigment was produced by decarboesterifying.

[Synthesis Example of the Azo Compound Having Carboester Groups Represented by the Formula (VI-1)]

0.94 g of precursor of an azo compound having carboester groups represented by the formula (VI-1) that means a compound represented by the formula (VI-1) but its all E groups are H (hydrogen atom), 2.6 g (12 times mol) of pyrocarboxylic acid di-tert-butyl ester were dispersed in 150 ml of dehydrated pyridine, and after the dispersion was stirred for 15 minutes at room temperature, the dispersion was heated to have a temperature about 50° C. and reacted for 2 hours. The dispersion gradually became reddish and a uniform solution was prepared. The solution was cooled to have a room temperature, and the solvent was removed. Then about 50 ml of ethyl acetate was added thereto to prepare 1.11 g of a red powder (yield rate: 83.2%).

Elemental analysis results of the synthesized compound (azo compound (VI-1) (E: $C_5H_9O_2$)) are shown in Table 6. Calcd. (%) of each element was calculated as the synthesized compound has a structure represented by the formula (VI-1) but its all carboester group (E group) are $C_5H_9O_2$, that means the azo compound has a chemical formula of $C_{68}H_{60}N_6O_{14}Br_2$.

TABLE 6

| Element Analysis | C | H | N |
|---|---|---|---|
| Found. (%) | 60.66 | 4.73 | 6.35 |
| Calcd. (%) | 60.72 | 4.50 | 6.25 |

An absorption based on a saturated hydrocarbon by a substituent was observed at 2,980 cm−1 and an absorption based on a stretching vibration of carbonate C=O was observed at 1,760 cm−1 in an infrared absorption spectrum (KBr tablet method) of the powder.

[Complex-Azo Pigment Comprising an Azo Compound (VI-1) Having all E Groups are H (Hydrogen Atom) and Chlorogallium Phthalocyanine Pigment]

0.34 g of the azo compound (VI-1) (E: $C_5H_9O_2$) was dispersed in 100 ml of N,N-dimethylformamide and heated with stirring, and then a dark red-brown solution was prepared. 3.1 g of chlorogallium phthalocyanine pigment was added in the dispersion, and then 5.2 g of acetic acid was added under strongly stirring, and reacted about 150° C. for 9 hours. After disappearance of the azo compound was made sure using thin-layer chromatography, the dispersion was cooled to have a room temperature, and then the dispersion was filtered using a membrane filter having a pore diameter of 0.1 µm (Fluoropore of Sumitomo Electric Industries, Ltd.), after that the residue was rinsed with 100 ml of 2-butanone twice, so that 3.2 g of dark mazarine powder was provided.

An absorption based on a saturated hydrocarbon by a substituent observed from the azo compound at 2,980 cm−1 was disappeared from the prepared dark mazarine powder, and also an absorption based on a stretching vibration of carbonate C=O at 1,760 cm−1 was disappeared in an infrared absorption spectrum (KBr tablet method) of the powder.

Example 8

An azo compound having carboester groups represented by the formula (VII-2) synthesized as follows and a titanium dioxide were mixed to provide a liquid mixture, and then a complex-azo pigment was produced by decarboesterifying.

[Synthesis Example of the Azo Compound Having Carboester Groups Represented by the Formula (VII-2)]

1.20 g of precursor of an azo compound having carboester groups represented by the formula (VII-2) that means a compound represented by the formula (VII-2) but its all E groups are H (hydrogen atom), 1.6 g (12 times mol) of pyrocarboxylic acid di-benzyl ester were dispersed in 150 ml of dehydrated pyridine, and after the dispersion was stirred for 15 minutes at room temperature, the dispersion was heated to have a temperature about 50° C. and reacted for 1 hour. The dispersion gradually became reddish and a uniform solution was prepared. The solution was cooled to have a room temperature, and the solvent was removed. Then about 50 ml of cyclohexane was added thereto to prepare 1.60 g of a red powder (yield rate: 79.6%).

Elemental analysis results of the synthesized compound (azo compound (VII-2) (E: $C_8H_7O_2$)) are shown in Table 7. Calcd. (%) of each element was calculated as the synthesized compound has a structure represented by the formula (VII-2) but its all carboester group (E group) are $C_8H_7O_2$, that means the azo compound has a chemical formula of $C_{127}H_{75}N_{11}O_{20}$.

TABLE 7

| Element Analysis | C | H | N |
| --- | --- | --- | --- |
| Found. (%) | 73.98 | 3.30 | 7.45 |
| Calcd. (%) | 73.51 | 3.64 | 7.43 |

An absorption based on a stretching vibration of carbonate C=O was observed at 1,760 cm−1 in an infrared absorption spectrum (KBr tablet method) of the powder.

[Complex-Azo Pigment Comprising an Azo Compound (VII-2) Having all E Groups are H (Hydrogen Atom) and Titanium Dioxide Pigment]

1.1 g of the azo compound (VII-2) (E: $C_8H_7O_2$) was dispersed in 100 ml of chlorobenzene and heated with stirring, and then a dark red-brown solution was prepared. 0.3 g of titanium dioxide pigment was added in the dispersion, and then 0.5 g of trifluoroacetic acid was added under strongly stirring, and reacted about 110° C. for 6 hours. After disappearance of the azo compound was made sure using thin-layer chromatography, the dispersion was cooled to have a room temperature, and then the dispersion was filtered using a membrane filter having a pore diameter of 0.1 μm (Fluoropore of Sumitomo Electric Industries, Ltd.), after that the residue was rinsed with 100 ml of methanol twice, so that 0.75 g of dark mazarine powder was provided.

An absorption based on a stretching vibration of carbonate C=O observed from the azo compound at 1,760 cm−1 was disappeared in an infrared absorption spectrum (KBr tablet method) of the powder.

Example 9

An azo compound having carboester groups represented by the formula (VIII-5) synthesized as follows and a titanylphthalocyanine were mixed to provide a liquid mixture, and then a complex-azo pigment was produced by decarboesterifying.

[Synthesis Example of the Azo Compound Having Carboester Groups Represented by the Formula (VIII-5)]

0.81 g of precursor of an azo compound having carboester groups represented by the formula (VIII-5) that means a compound represented by the formula (VIII-5) but its all E groups are H (hydrogen atom), 2.7 g (12 times mol) of pyrocarboxylic acid di-tert-amyl ester were dispersed in 150 ml of dehydrated pyridine, and after the dispersion was stirred for 15 minutes at room temperature, the dispersion was heated to have a temperature about 50° C. and reacted for 2 hours. The dispersion gradually became reddish and a uniform solution was prepared. The solution was cooled to have a room temperature, and the solvent was removed. Then about 50 ml of ethyl acetate was added thereto to prepare 1.1 g of a red powder (yield rate: 86.6%).

Elemental analysis results of the synthesized compound (azo compound (VIII-5) (E: $C_6H_{11}O_2$)) are shown in Table 8.

Calcd. (%) of each element was calculated as that the synthesized compound has a structure represented by the formula (VIII-5) but its all carboester group (E group) are $C_6H_{11}O_2$, that means the azo compound has a chemical formula of $C_{75}H_{72}N_6O_{13}$.

TABLE 8

| Element Analysis | C | H | N |
| --- | --- | --- | --- |
| Found. (%) | 71.20 | 5.79 | 6.35 |
| Calcd. (%) | 71.19 | 5.74 | 6.64 |

An absorption based on a saturated hydrocarbon by a substituent was observed at 2,980 cm−1 and an absorption based on a stretching vibration of carbonate C=O was observed at 1,760 cm−1 in an infrared absorption spectrum (KBr tablet method) of the powder.

[Complex-Azo Pigment Comprising an Azo Compound (VIII-5) Having all E Groups are H (Hydrogen Atom) and Titanylphthalocyanine Pigment]

1.01 g of the azo compound (VIII-5) (E: $C_6H_{11}O_2$) was dispersed in 100 ml of 2-butanone and heated with stirring, and then a dark red-brown solution was prepared. 0.92 g of titanylphthalocyanine pigment was added in the dispersion, and then 18.2 g of trifluoroacetic acid, 10 g of acetic acid and 0.5 g of water were added under strongly stirring, and reacted about 80° C. for 6 hours. After disappearance of the azo compound was made sure using thin-layer chromatography, the dispersion was cooled to have a room temperature, and then the dispersion was filtered using a membrane filter having a pore diameter of 0.1 μm (Fluoropore of Sumitomo Electric Industries, Ltd.), after that the residue was rinsed with 100 ml of methanol twice, so that 1.45 g of dark mazarine powder was provided.

An absorption based on a saturated hydrocarbon by a substituent observed from the azo compound at 2,980 cm−1 was disappeared from the prepared dark mazarine powder, and also an absorption based on a stretching vibration of carbonate C=O at 1,760 cm−1 was disappeared in an infrared absorption spectrum (KBr tablet method) of the powder.

Example 10

An azo compound having carboester groups represented by the formula (X-1) synthesized as follows and a fullerene (C60) were mixed to provide a liquid mixture, and then a complex-azo pigment was produced by decarboesterifying.

[Synthesis Example of the Azo Compound Having Carboester Groups Represented by the Formula (X-1)]

0.16 g of precursor of an azo compound having carboester groups represented by the formula (X-1) that means a compound represented by the formula (X-1) but its all E groups are H (hydrogen atom), 0.52 g (12 times mol) of pyrocarboxylic acid di-tert-butyl ester were dispersed in 30 ml of dehydrated pyridine, and after the dispersion was stirred for 15 minutes at room temperature, the dispersion was heated to have a temperature about 50° C. and reacted for 2 hours. The dispersion gradually became reddish and a uniform solution was prepared. The solution was cooled to have a room temperature, and the solvent was removed. Then about 50 ml of ethyl acetate was added thereto to prepare 0.16 g of a red powder (yield rate: 80%).

Elemental analysis results of the synthesized compound (azo compound (X-1) (E: $C_5H_9O_2$)) are shown in Table 9. Calcd. (%) of each element was calculated as the synthesized compound has a structure represented by the formula (X-1)

but its all carboester group (E group) are $C_5H_9O_2$, that means the azo compound has a chemical formula of $C_{64}H_{53}N_9O_{11}$.

TABLE 9

| Element Analysis | C | H | N |
|---|---|---|---|
| Found. (%) | 67.85 | 4.67 | 11.11 |
| Calcd. (%) | 68.38 | 4.75 | 11.21 |

An absorption based on a saturated hydrocarbon by a substituent was observed at 2,980 cm−1 and an absorption based on a stretching vibration of carbonate C═O was observed at 1,760 cm−1 in an infrared absorption spectrum (KBr tablet method) of the powder.

[Complex-Azo Pigment Comprising an Azo Compound (X-1) Having all E Groups are H (Hydrogen Atom) and Fullerene (C60) Pigment]

0.15 g of the azo compound (X-1) (E: $C_5H_9O_2$) was dispersed in 50 ml of cyclohexanone and heated with stirring, and then a dark red-brown solution was prepared. 0.29 g of fullerene (C60) pigment was added in the dispersion, and then 9.1 g of trifluoroacetic acid was added under strongly stirring, and reacted about 130° C. for 10 hours. After disappearance of the azo compound was made sure using thin-layer chromatography, the dispersion was cooled to have a room temperature, and then the dispersion was filtered using a membrane filter having a pore diameter of 0.1 μm (Fluoropore of Sumitomo Electric Industries, Ltd.), after that the residue was rinsed with 50 ml of acetone twice, so that 0.3 g of dark mazarine powder was provided.

An absorption based on a saturated hydrocarbon by a substituent observed from the azo compound at 2,980 cm−1 was disappeared from the prepared dark mazarine powder, and also an absorption based on a stretching vibration of carbonate C═O at 1,760 cm−1 was disappeared in an infrared absorption spectrum (KBr tablet method) of the powder.

Example 11

An azo compound having carboester groups represented by the formula (III-2) synthesized according to Example 2, an azo compound having carboester groups represented by the formula (III-3) synthesized according to Example 1 and a metal-free phthalocyanine pigment were mixed to provide a liquid mixture, and then a complex-azo pigment was produced by decarboesterifying.

[Complex-Azo Pigment Comprising an Azo Compound (III-2) and (III-3) Having all E Groups are H (Hydrogen Atom) and Metal-Free Phthalocyanine Pigment]

0.48 g of the azo compound (III-2) (E: $C_5H_9O_2$) synthesized according to Example 2 and 0.82 g of metal-free phthalocyanine pigment were dispersed in 100 ml of o-xylene, and reacted at 145° C. for 10 hours, after that cooled to 90° C. 0.25 g of the azo compound (III-3) (E: $C_5H_9O_2$) synthesized according to Example 1 was added to the dispersion, and then 1.8 g of trifluoroacetic acid was added thereto, and reacted at 90° C. for 5 hours. After disappearance of the azo compound was made sure using thin-layer chromatography, the dispersion was cooled to have a room temperature, and then the dispersion was filtered using a membrane filter having a pore diameter of 0.1 μm (Fluoropore of Sumitomo Electric Industries, Ltd.), after that the residue was rinsed with 100 ml of methanol twice, so that 1.05 g of dark mazarine powder was provided.

An absorption based on a saturated hydrocarbon by a substituent observed from the azo compound at 2,980 cm−1 was disappeared from the prepared dark mazarine powder, and also an absorption based on a stretching vibration of carbonate C═O at 1,760 cm−1 was disappeared in an infrared absorption spectrum (KBr tablet method) of the powder.

Example 12

An azo compound having carboester groups represented by the formula (III-3) synthesized according to Example 1 and a hydroxygallium phthalocyanine pigment were mixed to provide a liquid mixture, and then a complex-azo pigment was produced by decarboesterifying.

[Complex-Azo Pigment Comprising an Azo Compound (III-3) Having all E Groups are H (Hydrogen Atom) and Hydroxygallium Phthalocyanine Pigment]

0.98 g of the azo compound (III-3) (E: $C_5H_9O_2$) synthesized according to Example 1 and 0.48 g of hydroxygallium phthalocyanine pigment (synthesized according to JOP 2003-929331) and 9.1 g of sulfuric acid were dispersed in 70 ml of 2-butanone and reacted at 80° C. for 8 hours. After disappearance of the azo compound was made sure using thin-layer chromatography, the dispersion was cooled to have a room temperature, and then the dispersion was filtered using a membrane filter having a pore diameter of 0.1 μm (Fluoropore of Sumitomo Electric Industries, Ltd.), after that the residue was rinsed with 100 ml of 2-butanone twice, so that 0.99 g of dark mazarine powder was provided.

An absorption based on a saturated hydrocarbon by a substituent observed from the azo compound at 2,980 cm−1 was disappeared from the prepared dark mazarine powder, and also an absorption based on a stretching vibration of carbonate C═O at 1,760 cm−1 was disappeared in an infrared absorption spectrum (KBr tablet method) of the powder.

Practical Application Example

[Example of an Electrophotographic Photoreceptor Having the Complex-Azo Compound Manufactured According to Example 3]

On an aluminum cylinder of 30 mm in diameter and 340 mm in length, a coating liquid for undercoat layer, coating liquid for charge generating layer, and coating liquid for charge transporting layer, each having a composition described below, were sequentially applied and dried to form a undercoat layer of 3.5 μm, charge generating layer, and charge transporting layer of 28 μm. The thickness of the charge generating layer was adjusted such that the transmittance of the charge generating layer at 650 nm was 20%.

The transmittance at 650 nm of the charge generating layer was evaluated by comparing transmittances of two samples between a sample having a layer formed with the same coating liquid for charge generating layer under the same condition for coating the charge generating layer on a polyethylene terephthalate film and a sample of polyethylene terephthalate film without a layer formed with the coating liquid for charge generating layer. It was measured by a commercially available spectrophotometer (UV-3100, by Shimadzu Co.).

The cured film was dried at 130° C. for 20 minutes to form a undercoat, 150° C. for 20 minutes to form a charge generating layer and 120° C. for 20 minutes to form a charge transporting layer, so that electrophotographic photoreceptor 1 was provided.

[Coating Solution for Undercoat Layer]
Titanium oxide (CR-EL, Ishihara Sangyo Ltd.) 50 parts
Alkyde resin*1) 14 parts
Melamine resin*2) 8 parts
2-butanone 120 parts

*1) Bekolite M6401-50, Solid Content: 50% Dainippon Ink and Chemicals, Inc.
*2) Super Bekamine L-145-60, Solid Content: 60% Dainippon Ink and Chemicals, Inc.

[Coating Liquid for Charge Generating Layer]
Complex-azo pigment (Example 3) 10 parts
Polyvinyl butyral (BX-1, Sekisui Chemical Co.) 10 parts
cyclohexanone 420 parts
2-butanone 180 parts

[Coating Liquid for Charge Transporting Layer]
Bisphenol Z Polycarbonate (TS2050, by Teijin Chemicals Ltd.) 10 parts
Charge transporting material of following formula (d) 7 parts
Tetrahydrofuran 80 parts
1% silicone oil solution in tetrahydrofuran *1) 0.2 part
*1) KF50-1cs, by Shin-Etsu Chemical Co., Ltd.

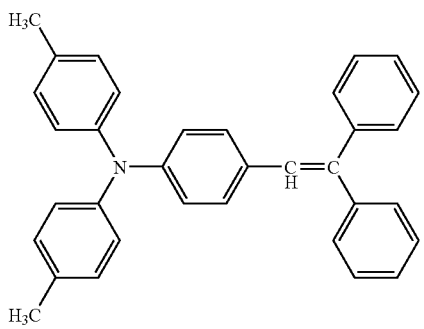

(d)

[Paper-Passing Test]

For a paper running test by a real machine, the photoreceptor described above is loaded in a process cartridge for electrophotography, and then the process cartridge is loaded in the modified machine of Imagio Neo 271 manufactured by Ricoh Company Limited.

An electric potential in exposed region when a solid black image was outputting (whole area of photoreceptor was exposed), image density of solid black image printed out and the printed images were evaluated. Existence of abnormal phenomenon of images, for example black dots occurred because of a defective transfer of the toner in the pathway and hence a defective image at image formation, white dots occurred because of resulting in image failure in which toner is partially absent in the form of white dots, a phenomenon that is referred to as white-dotted images black streaks or white streaks contained on an image were totally evaluated.

As a paper-passing test, printing is serially performed for 300,000 sheets after the setting of the dark part potential to −800 V so that the image and dark part potential are measured at an initial printing stage and at a 300,000th printing stage. A4-size (MY PAPER, manufactured by NBS Ricoh Company Ltd.) was conducted for each of the latent electrostatic image bearing member (electrophotographic photoconductor). The results obtained by evaluating the photoreceptors are shown in Table 10.

Electric potential in exposed region was measured as follows.

The bright section potential of the electrophotographic photoreceptor surface was measured as follows. A unit for development was taken apart and a probe connecting to an surface electrometer was fixed to the unit for development, so that the probe came to the position of 50 mm from upside of the electrophotographic photoreceptor when the electrophotographic photoreceptor is loaded in the unit for development. And then the electrophotographic photoreceptor was loaded in the unit for development. The bright section potential was determined from the surface electric potential at the time of outputting a solid black image after adjusting the grid electric potential such that the electric potential in the dark space was −800 (V). The surface electric potential of the latent electrostatic image bearing member was measured using TREK MODEL344. Electrophotographic photoreceptor was evaluated under room temperature.

The result of image evaluation was classified into three levels as follows.
○: Deterioration of image quality was not found.
Δ: Deterioration of image quality was slightly found.
X: Serious deterioration of image quality was found.

TABLE 10

| Initial evaluation | | Evaluation after 0.3 million times printed | |
|---|---|---|---|
| electric potential in exposed region [−V] | Quality of image forming | electric potential in exposed region [−V] | Quality of image forming |
| 100 | ○ | 120 | ○ |

In the present invention, a complex-azo pigment includes plural pigment components manufactured by decarboesterifying an azo compound having at least one carboester group that is soluble to solvent and converting the compound to an azo pigment including plural pigments. The pigments are mixed on the molecule level, and these pigments can be uniform and finely dispersed complex construction, impurities can be removed from the pigments, so sufficient functions as an organic photoconductor can be provided. Therefore, a complex-azo pigment of the present invention is suitable for a photoconductor used for a high-speed copying machine or laser beam printer.

This document claims priority and contains subject matter related to Japanese Patent Application No. 2008-179262, filed on Jul. 9, 2008, Japanese Patent Application No. 2008-179282, filed on Jul. 9, 2008 and Japanese Patent Application No. 2009-054602, filed on Mar. 9, 2009, the entire contents of each of which are incorporated herein by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. A method of preparing a complex-azo pigment having plural pigment components including at least one azo pigment represented by the following formula (a), comprising:
converting an azo compound having a carboester group represented by formula (I) into an azo compound represented by formula (a) by chemically, thermally or photolytically decarboesterifying an azo compound having a carboester group represented by formula (I):

$$A(E)_n \qquad (I)$$

wherein A represents a residue of an azo compound, bonded with n E groups through one or more heteroatoms N or O and forming a part of the residue A, the E group(s) independently representing a hydrogen atom or a carboester group represented by formula (b), $$—C(=O)—O—R1 \qquad (b)$$

wherein R1 represents a substituted or unsubstituted alkyl group having 3 to 15 carbon atoms, a substituted or unsubstituted alkenyl group, a substituted or unsubstituted alkynyl group, a substituted or unsubstituted cycloalkyl group, a substituted or unsubstituted cycloalkenyl group, or a substituted or unsubstituted aralkyl group, wherein all E groups are not hydrogen atoms at the same time, and n represents an integer of from 1 to 9, A(H)$n$                 (a)

wherein A in (a) is the same as in formula (I), H represents a hydrogen atom, and n represents an integer of from 1 to 9.

2. The method according to claim 1, comprising converting the azo compound having a carboester group represented by formula (I) into an azo compound represented by formula (a) in the presence of at least one other pigment.

3. The method according to claim 2, wherein said other pigment comprises at least one pigment selected from the group consisting of phthalocyanine pigments, azo pigments, condensed polycyclic pigments, fullerene, carbon nanotube or inorganic nanopigments, and mixtures thereof.

4. The method according to claim 1, comprising converting at least two azo compounds having a carboester group represented by formula (I) into compounds of formula (a) by thermally or photolytically decarboesterifying.

5. The method according to claim 1, wherein the azo compound having a carboester group represented by the formula (I) is dissolved in an organic solvent to provide a solution (i) and then an adsorption treatment is applied to the solution (i) using silicagel, alumina, florisil, activated carbon, activated soil, diatomaceous earth or perlite to provide a solution (ii), prior to converting the compound represented by formula (I) included in the solution (ii) into a compound represented by formula (a).

6. The method according to claim 1, comprising converting the azo compound having a carboester group represented by formula (I) into an azo compound represented by formula (a) using an acidic catalyst.

7. The method according to claim 1, comprising converting the azo compound having a carboester group represented by formula (I) into an azo compound represented by formula (a) chemically and thermally.

8. The method according to claim 1, wherein, in formula (I) and formula (a), A represents a residue of an azo compound represented by the following formula (II), B—(N=N-Cp)$_m$           (II)

wherein B represents a main skeleton of an azo compound, Cp represents a coupler component residue, and m represents an integer of 2 or 3.

9. The method according to claim 8, wherein in formula (II), Cp is at least one of the following formulae (1) to (9):

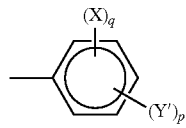
(1)

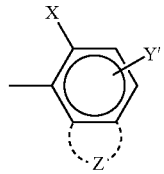
(2)

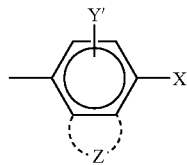
(3)

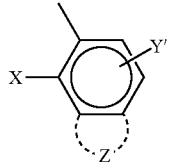
(4)

wherein X in formulae (1) to (4) represents —OH, —N(R1)(R2) or —NHSO2-R3, R1 represents a hydrogen atom or a substituted or unsubstituted alkyl group, R2 represents a hydrogen atom, a substituted or unsubstituted alkyl group, a substituted or unsubstituted alkenyl group, or a substituted or unsubstituted aryl group, $Y^1$ in formulae from (1) to (4) represents a hydrogen atom, a halogen atom, a substituted or unsubstituted alkyl group, a substituted or unsubstituted alkoxy group, a carboxy group, sulfone group, a substituted or unsubstituted sulfamoyl group or —CON(R4)(Y2), R4 represents a hydrogen atom, a substituted or unsubstituted alkyl group, a substituted or unsubstituted phenyl group, Y2 represents a substituted or unsubstituted cycloalkyl group, substituted or unsubstituted heterocycloalkyl group or —N=C(R5) (R6), R5 represents a substituted or unsubstituted cycloalkyl group, substituted or unsubstituted heterocycloalkyl group or substituted or unsubstituted styryl group, R6 represents a hydrogen atom, a substituted or unsubstituted alkyl group or a substituted or unsubstituted phenyl group, or alternatively R5 and R6 optionally form a ring with carbon atoms bonded therewith, Z represents a substituted or unsubstituted cycloalkyl group or a substituted or unsubstituted heterocycloalkyl group, p represents an integer of 1 or 2, q represents an integer of 1 or 2;

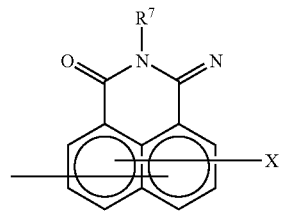
(5)

wherein $R^7$ in the formula (5) represents a substituted or unsubstituted hydrocarbon group and X is same as the above-mentioned;

(6)

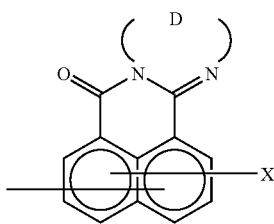

wherein D in the formula (6) represents a substituted or unsubstituted divalent radical of an aromatic hydrocarbon forming a heterocycle optionally having further N atoms than the two N atoms indicated in formula (6), or represents a substituted or unsubstituted divalent radical including at least one more heteroatom other than the two N atoms indicated in the formula (6) forming a ring, and X is same as the above-mentioned;

(7)

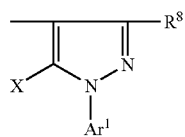

wherein $R^8$ in the formula (7) represents a substituted or unsubstituted alkyl group, carbamoyl group, carboxy group or its ester, $Ar^1$ represents a substituted or unsubstituted cycloalkyl group, and X is same as the above-mentioned;

(8)

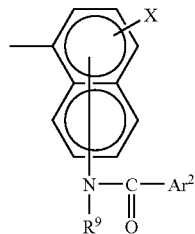

(9)

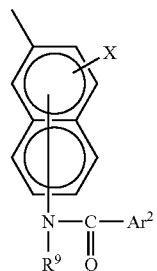

wherein $R^9$ in the formula (8) and formula (9) represents a hydrogen atom, a substituted or unsubstituted hydrocarbon group, $Ar^2$ represents a substituted or unsubstituted cycloalkyl group, but $R^9$ can't be a hydrogen atom and $Ar^2$ can't be a cycloalkyl group nor cycloalkenyl group at the same time.

10. The method according to claim 8, wherein B in formula (II) represents formula (III):

(III)

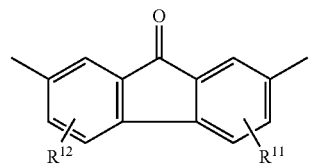

wherein $R^{11}$ and $R^{12}$ in the formula (III) independently represent a hydrogen atom, a halogen atom, a substituted or unsubstituted alkyl group, a substituted or unsubstituted alkoxy group, a carboxyl group or its ester group.

\* \* \* \* \*